United States Patent
Potts

(10) Patent No.: US 10,792,739 B2
(45) Date of Patent: *Oct. 6, 2020

(54) AUTOMATICALLY CONFIGURABLE BLIND CUTTING CENTER

(75) Inventor: Joseph Potts, Wendell, NC (US)

(73) Assignee: Hunter Douglas Industries Switzerland GmbH, Lucerne (CH)

( * ) Notice: Subject to any disclaimer, the term of this patent is extended or adjusted under 35 U.S.C. 154(b) by 734 days.

This patent is subject to a terminal disclaimer.

(21) Appl. No.: 12/877,377

(22) Filed: Sep. 8, 2010

(65) Prior Publication Data

US 2011/0088524 A1    Apr. 21, 2011

Related U.S. Application Data

(63) Continuation of application No. 10/378,320, filed on Mar. 3, 2003, now Pat. No. 7,810,418.

(51) Int. Cl.
| | | |
|---|---|---|
| *B23D 23/00* | (2006.01) | |
| *B23D 45/00* | (2006.01) | |
| *B26D 1/08* | (2006.01) | |
| *B26D 5/12* | (2006.01) | |
| *B26D 5/34* | (2006.01) | |
| *B26D 7/28* | (2006.01) | |
| *E06B 9/266* | (2006.01) | |

(52) U.S. Cl.
CPC .......... *B23D 45/003* (2013.01); *B23D 23/00* (2013.01); *B26D 1/08* (2013.01); *B26D 5/34* (2013.01); *E06B 9/266* (2013.01); *B26D 5/12* (2013.01); *B26D 7/28* (2013.01); *Y10T 83/04* (2015.04); *Y10T 83/408* (2015.04); *Y10T 83/525* (2015.04); *Y10T 83/535* (2015.04); *Y10T 83/538* (2015.04); *Y10T 83/543* (2015.04); *Y10T 83/626* (2015.04); *Y10T 83/858* (2015.04); *Y10T 83/8748* (2015.04)

(58) Field of Classification Search
CPC .............. B23D 23/00; B23D 2023/005; B23D 2023/0005
USPC ..... 83/35, 36, 196–198, 360, 365, 366, 368, 83/399, 400, 467.1, 468, 468.1, 468.2, 83/468.5, 468.6, 468.7, 485, 487, 563, 83/564; 29/24.5; 144/5; 700/116, 117, 700/159, 160, 167, 169, 179
See application file for complete search history.

(56) References Cited

U.S. PATENT DOCUMENTS

| | | | |
|---|---|---|---|
| 239,691 | A | 4/1881 | Appleton |
| 421,027 | A | 2/1890 | Hammond |
| 702,200 | A | 6/1902 | Greene |
| 1,382,433 | A | 6/1921 | McCarty |
| 1,647,254 | A | 11/1927 | Simmons |
| 1,721,276 | A | 7/1929 | Marsilius |
| 1,792,522 | A | 2/1931 | Yates |
| 1,924,162 | A | 8/1933 | Mason |

(Continued)

FOREIGN PATENT DOCUMENTS

| | | |
|---|---|---|
| CA | 2136519 A1 | 5/1996 |
| CA | 2355507 A | 2/2003 |

(Continued)

*Primary Examiner* — Clark F Dexter
(74) *Attorney, Agent, or Firm* — Dority & Manning, P.A.

(57) ABSTRACT

A method and apparatus for sizing window coverings slidably extendable from a bay into an aisle of a retail outlet. The method includes the steps of locating the center of the window covering relative to a cutting station utilizing a half scale for removing a portion of the window covering from each of its ends.

6 Claims, 24 Drawing Sheets

(56) References Cited

U.S. PATENT DOCUMENTS

| | | |
|---|---|---|
| 2,044,481 A | 6/1936 | Manely et al. |
| 2,057,488 A | 10/1936 | Hochstadt |
| 2,201,413 A * | 5/1940 | Turner ............... B23D 53/005 83/448 |
| 2,247,314 A | 6/1941 | Sellmeyer |
| 2,418,515 A | 4/1947 | Lewis |
| D155,897 S | 11/1949 | Huntington |
| 2,631,508 A | 3/1953 | Muehling |
| 2,644,520 A | 7/1953 | Nelson |
| 2,691,994 A | 10/1954 | Ferguson |
| 2,789,639 A | 5/1956 | Small |
| 2,806,493 A | 9/1957 | Gaskell |
| 2,883,736 A | 3/1958 | Adelman |
| 2,949,943 A | 8/1960 | Islandsrud |
| 2,987,085 A | 6/1961 | Porter |
| 3,260,146 A | 7/1966 | Child |
| 3,263,544 A | 8/1966 | Margolien |
| 3,292,232 A | 12/1966 | Nilsson |
| 3,391,591 A | 7/1968 | Funke |
| 3,470,926 A | 10/1969 | Dohm |
| 3,513,740 A | 5/1970 | Burghart |
| 3,564,893 A | 2/1971 | Richards et al. |
| 3,584,380 A | 6/1971 | Mehler et al. |
| 3,618,297 A | 11/1971 | Hamrick |
| 3,634,975 A | 1/1972 | Hensley |
| 3,664,221 A | 5/1972 | Breetvelt |
| 3,677,117 A | 7/1972 | Cutter |
| 3,715,946 A | 2/1973 | Kaltenbach |
| 3,736,631 A | 6/1973 | Edixhoven |
| 3,750,509 A | 8/1973 | Kruse |
| 3,766,815 A | 10/1973 | Edixhoven |
| 4,018,118 A | 4/1977 | Goff |
| 4,036,092 A | 7/1977 | Kaltenbach |
| 4,055,206 A | 10/1977 | Griffin |
| 4,067,252 A | 1/1978 | Peddinghaus et al. |
| 4,139,043 A | 2/1979 | Donofrio |
| 4,151,768 A | 5/1979 | Shockovsky |
| 4,188,693 A | 2/1980 | Edixhoven |
| 4,201,256 A | 5/1980 | Truhan |
| 4,214,493 A | 7/1980 | Elhaus |
| 4,227,902 A | 10/1980 | Olson |
| 4,230,005 A | 10/1980 | Varga |
| 4,233,782 A | 11/1980 | Perrault |
| 4,262,564 A | 4/1981 | Kaltenbach |
| 4,270,253 A | 6/1981 | Herb et al. |
| 4,326,864 A | 4/1982 | Sittler |
| 4,338,710 A | 7/1982 | Stursa et al. |
| 4,367,665 A | 1/1983 | Terpstra et al. |
| 4,407,614 A | 10/1983 | Muhr et al. |
| 4,457,197 A | 7/1984 | Wepner et al. |
| 4,468,995 A | 9/1984 | Mireles-Saldivar |
| 4,492,301 A | 1/1985 | Inaba et al. |
| 4,545,100 A | 10/1985 | Gaillard et al. |
| 4,567,930 A | 2/1986 | Fischer |
| 4,576,072 A | 3/1986 | Terpstra et al. |
| 4,606,099 A | 8/1986 | Schluep et al. |
| 4,619,166 A | 10/1986 | Valavaara |
| 4,625,868 A | 12/1986 | Bischof |
| 4,639,987 A | 2/1987 | Georgopoulos |
| 4,721,058 A | 1/1988 | Hayamizu et al. |
| 4,726,273 A | 2/1988 | Miceli |
| 4,730,372 A | 3/1988 | Tsuchida |
| 4,771,667 A | 9/1988 | Forman et al. |
| 4,790,226 A | 12/1988 | Tsuchida |
| 4,807,363 A | 2/1989 | Clifton, Jr. |
| 4,819,530 A | 4/1989 | Huang |
| 4,823,449 A | 4/1989 | Chang |
| 4,876,795 A | 10/1989 | Chun-cheng |
| 4,901,419 A | 2/1990 | Voss |
| 4,907,325 A | 3/1990 | Hsu |
| 4,907,337 A | 3/1990 | Krusi |
| 4,924,740 A | 5/1990 | Wright |
| 4,928,369 A | 5/1990 | Schnebly et al. |
| 4,987,765 A | 1/1991 | Nishimura et al. |
| 4,993,131 A | 2/1991 | Graves et al. |
| D316,979 S | 5/1991 | Reynolds |
| 5,037,253 A | 8/1991 | Molaro et al. |
| 5,054,206 A | 10/1991 | Carlson |
| 5,056,388 A | 10/1991 | Dekker et al. |
| 5,060,709 A | 10/1991 | Simon |
| 5,072,494 A | 12/1991 | Graves et al. |
| 5,103,702 A | 4/1992 | Yannazzone |
| 5,119,854 A | 6/1992 | Chanoine et al. |
| 5,215,512 A | 6/1993 | De Dompierre |
| 5,251,382 A | 10/1993 | Hellar |
| 5,339,716 A | 8/1994 | Sands et al. |
| 5,392,524 A | 2/1995 | Hill |
| 5,456,149 A | 10/1995 | Elsenheimer et al. |
| 5,667,152 A | 9/1997 | Mooring |
| 5,740,053 A | 4/1998 | Iwama |
| 5,787,774 A | 8/1998 | Richards et al. |
| 5,799,557 A | 9/1998 | Wang |
| 5,806,245 A | 9/1998 | Satrom |
| 5,806,394 A | 9/1998 | Marocco |
| 5,816,126 A | 10/1998 | Pluber |
| 5,819,619 A | 10/1998 | Miller et al. |
| 5,826,317 A | 10/1998 | van Oostrom et al. |
| 5,882,155 A | 3/1999 | Testa, Jr. |
| 5,927,172 A | 7/1999 | Wang |
| 5,943,932 A | 8/1999 | Sberveglieri |
| 5,971,839 A | 10/1999 | Schmelzer |
| 6,003,217 A | 12/1999 | Graves et al. |
| 6,003,218 A | 12/1999 | Schumann et al. |
| 6,079,306 A | 6/2000 | Liu |
| 6,089,134 A | 7/2000 | Marocco |
| 6,142,196 A | 11/2000 | Schumann et al. |
| 6,178,857 B1 | 1/2001 | Marocco |
| 6,202,014 B1 | 3/2001 | Brandt et al. |
| 6,334,379 B1 | 1/2002 | Sudano |
| 6,336,388 B1 | 1/2002 | Marocco |
| 6,362,893 B1 | 3/2002 | Francis et al. |
| 6,405,406 B1 | 6/2002 | Chen |
| 6,412,381 B1 | 7/2002 | Wang et al. |
| 6,418,762 B1 | 7/2002 | Munch et al. |
| 6,418,768 B2 | 7/2002 | Meisser et al. |
| 6,427,571 B1 | 8/2002 | Hsu |
| 6,500,048 B1 | 12/2002 | Bar |
| 6,535,294 B1 | 3/2003 | Arledge, Jr. et al. |
| 6,561,121 B1 | 5/2003 | Rose |
| 6,604,443 B2 * | 8/2003 | Roberts ............... B23D 23/00 83/13 |
| 6,615,698 B2 | 9/2003 | Chuang et al. |
| 6,783,563 B1 | 8/2004 | Eckhoff et al. |
| 7,810,418 B2 * | 10/2010 | Potts ............... B23D 23/00 144/5 |
| 2002/0017884 A1 | 2/2002 | Ishida |
| 2002/0117039 A1 | 8/2002 | Huang |
| 2003/0015074 A1 * | 1/2003 | Roberts ............... B23D 23/00 83/13 |
| 2003/0033919 A1 | 2/2003 | Lin et al. |
| 2003/0066403 A1 * | 4/2003 | Lin et al. ............... B23D 23/00 83/412 |
| 2003/0110913 A1 | 6/2003 | Lin et al. |
| 2003/0140756 A1 | 7/2003 | Lin et al. |
| 2004/0173076 A1 * | 9/2004 | Potts ............... B23D 23/00 83/522.19 |

FOREIGN PATENT DOCUMENTS

| | | |
|---|---|---|
| CN | 250743 | 7/1995 |
| CN | 269841 | 2/1996 |
| DE | 857677 C | 12/1952 |
| DE | 223 048 C | 6/2010 |
| EP | 0265564 A1 | 5/1988 |
| EP | 0273535 A1 | 7/1988 |
| EP | 0629475 A1 | 12/1994 |
| GB | 1213388 A | 11/1970 |
| GB | 2258686 A | 2/1993 |
| WO | WO-0107747 A1 | 2/2001 |
| WO | WO-2003010408 A2 | 2/2003 |

* cited by examiner

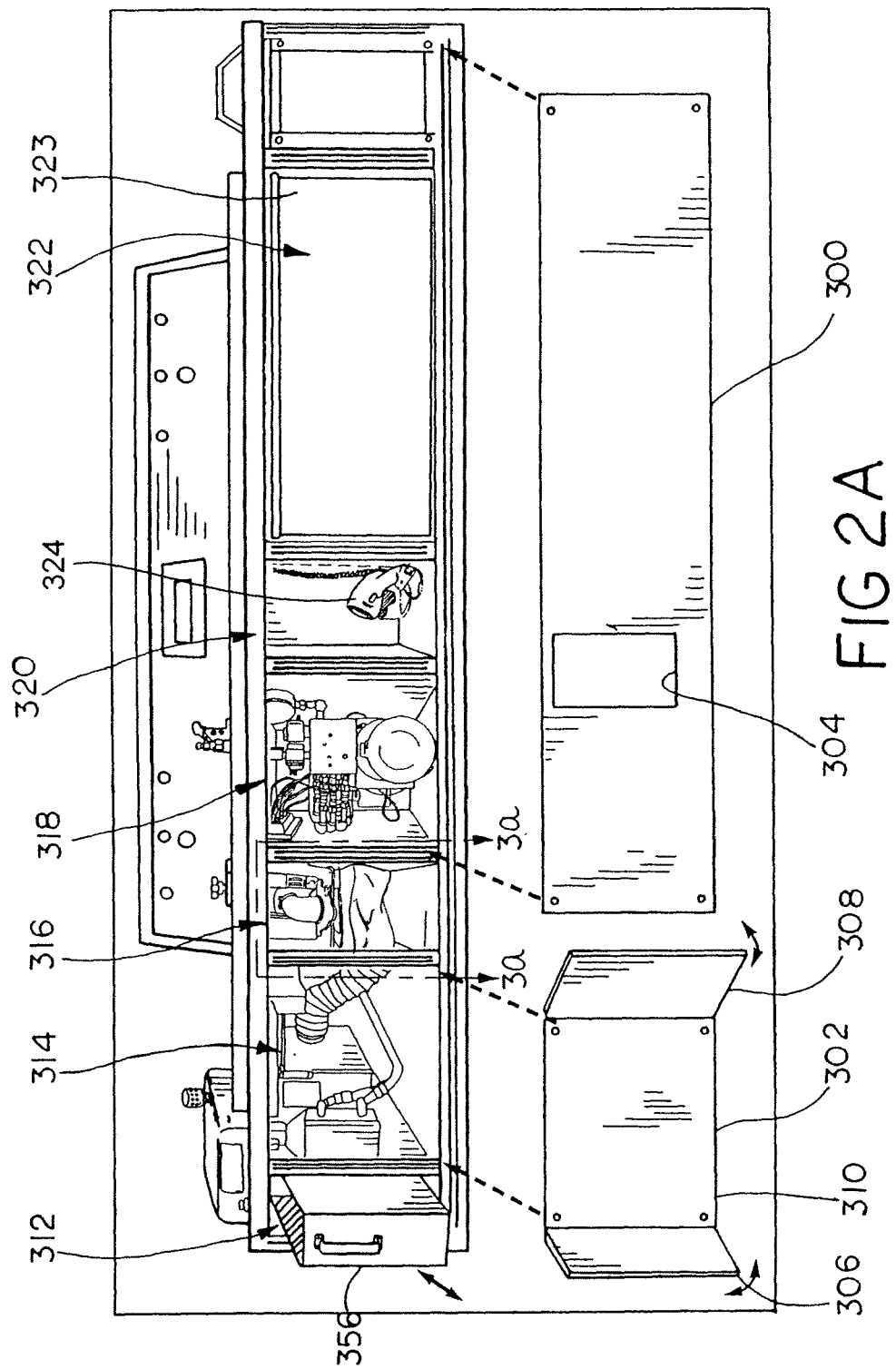

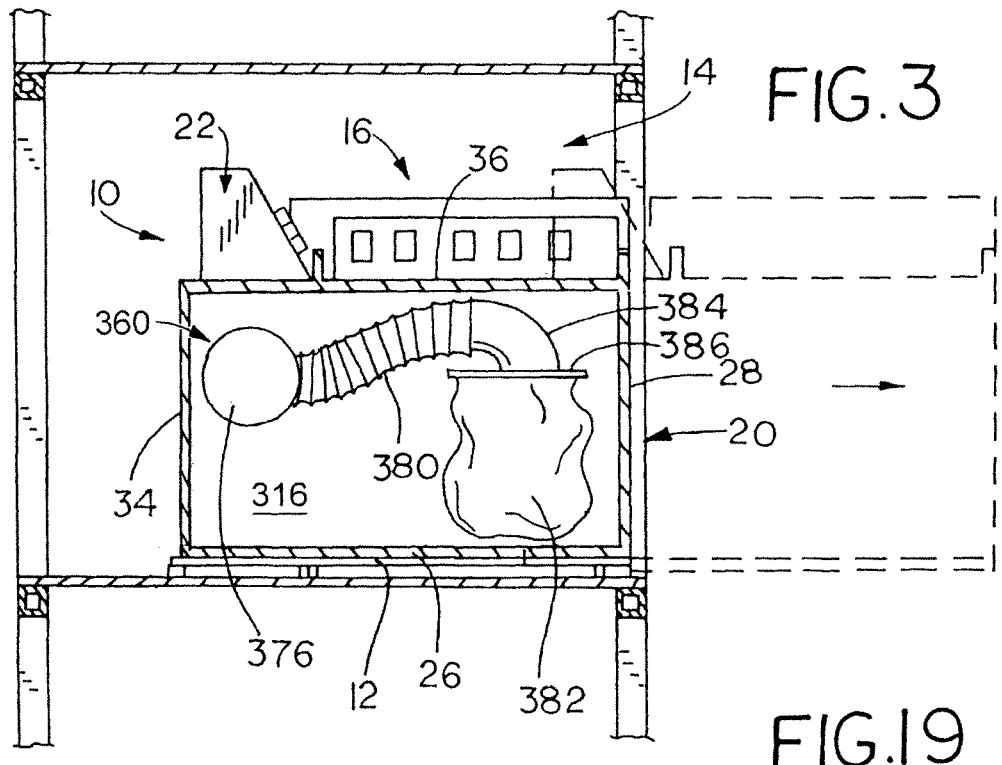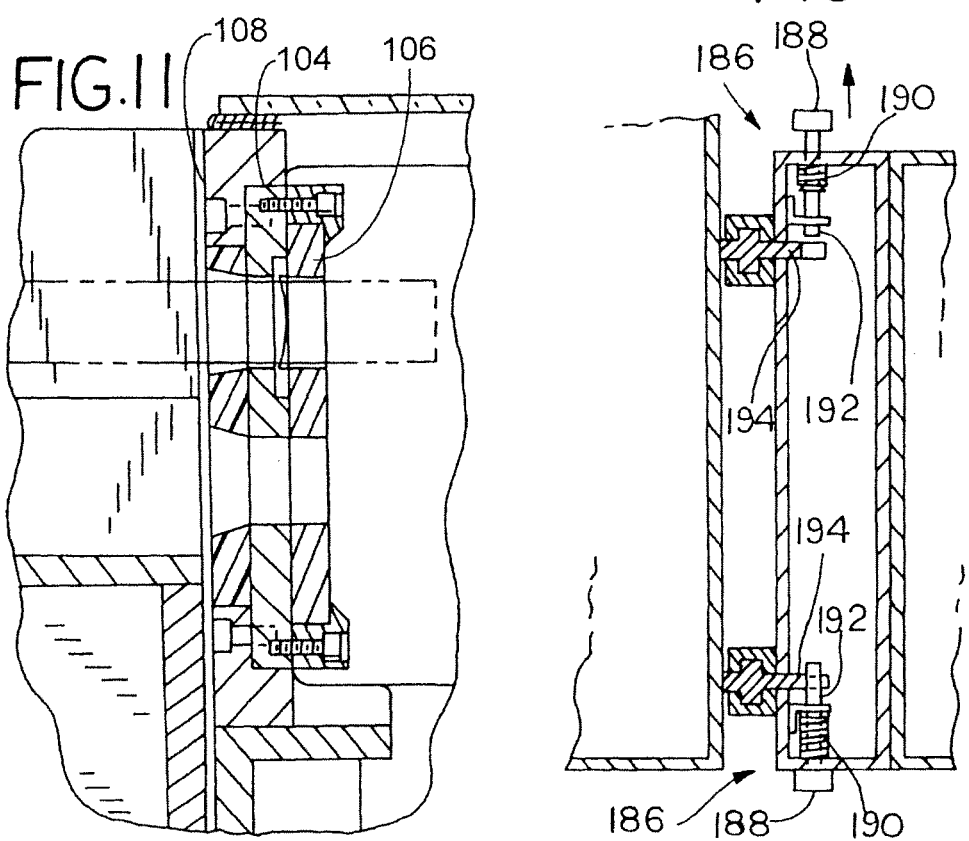

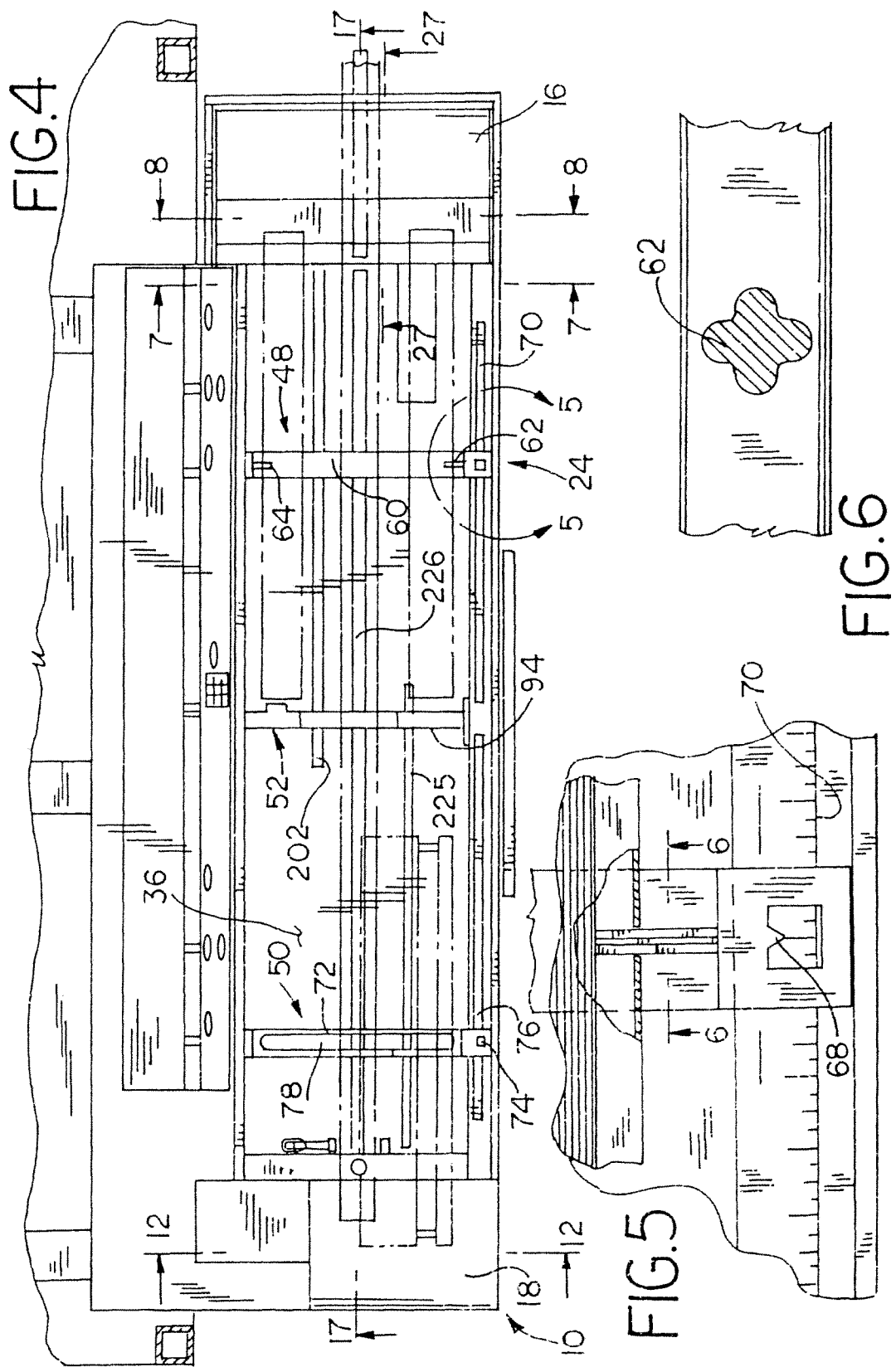

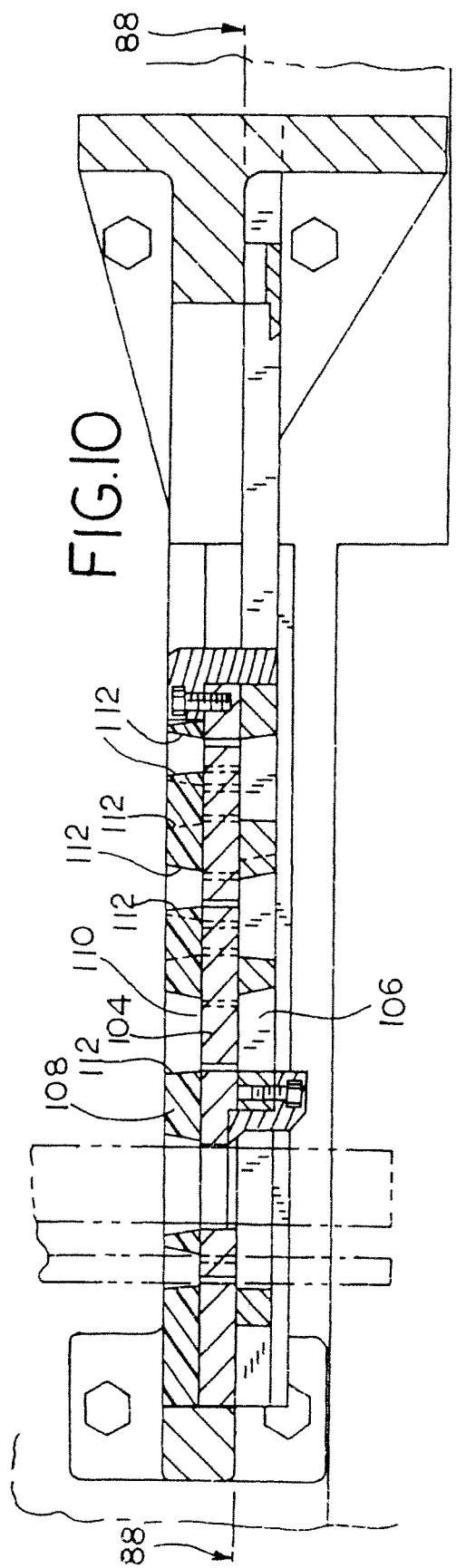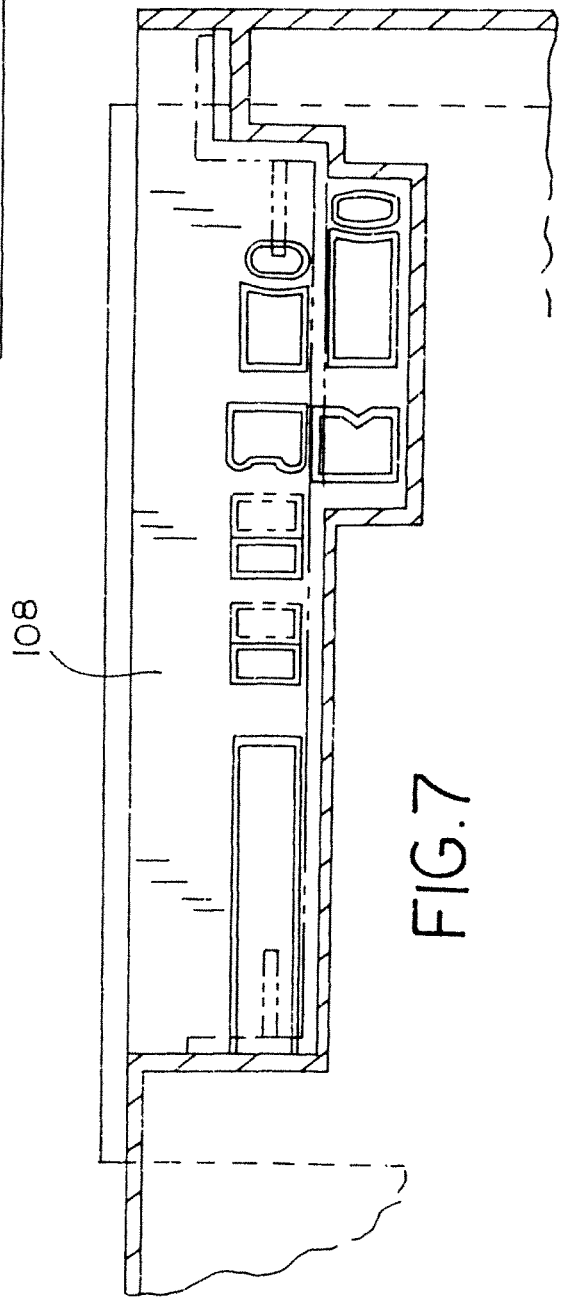

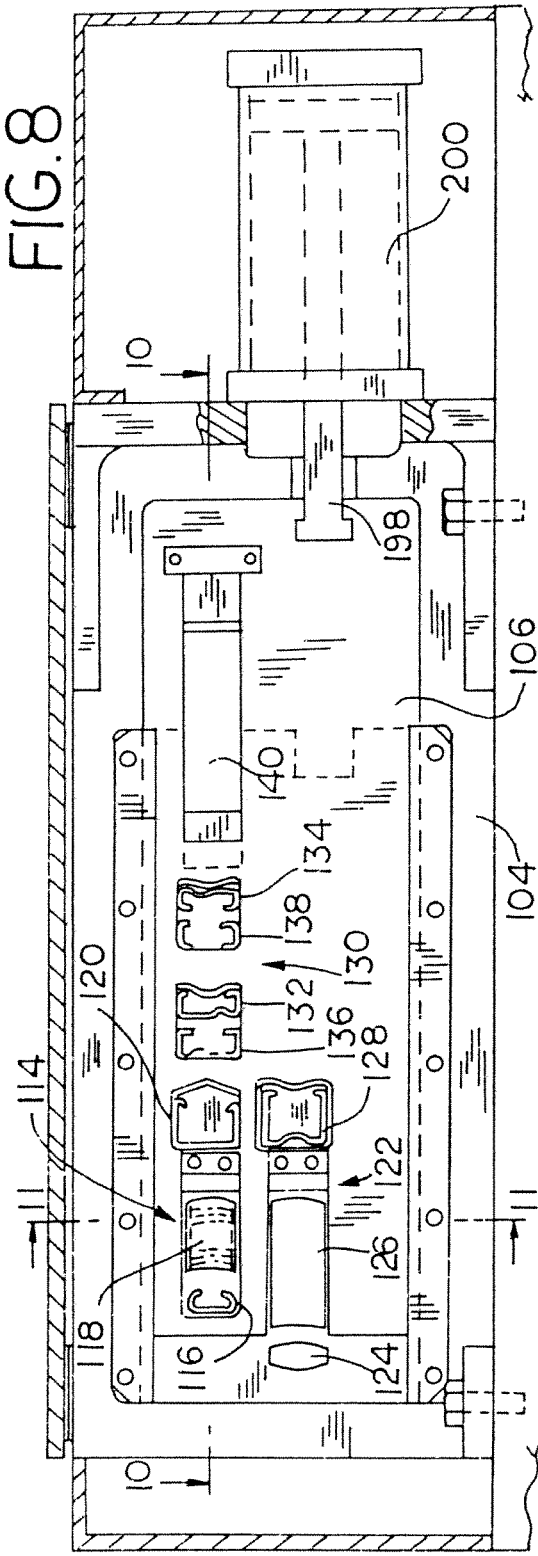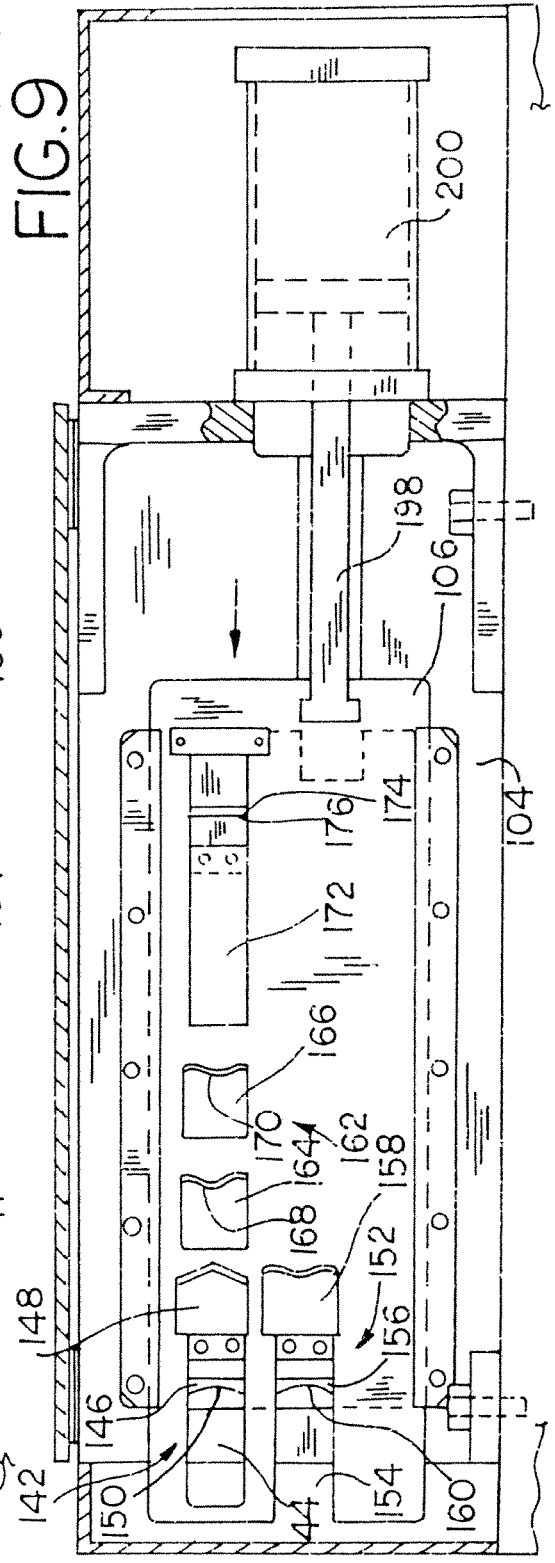

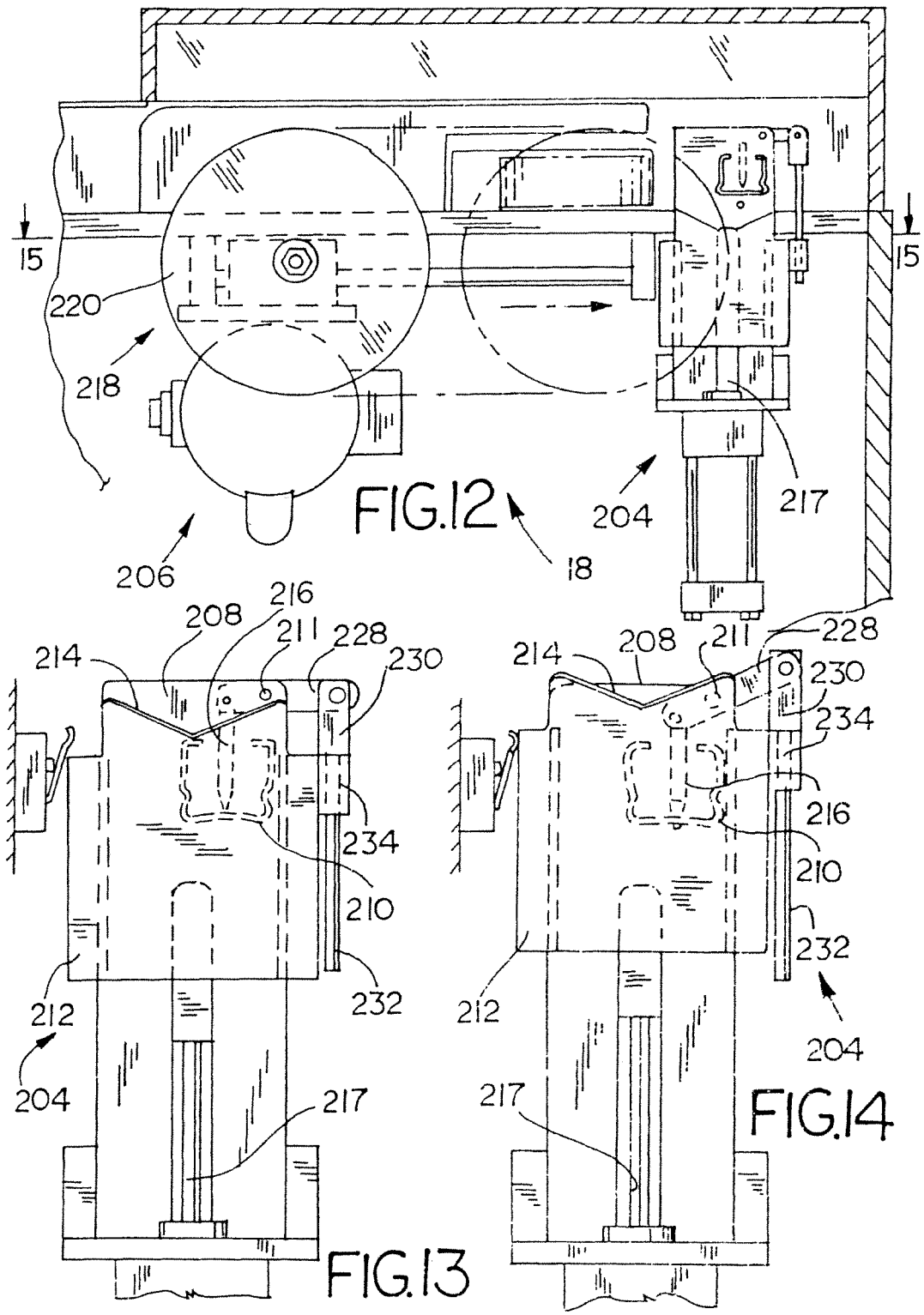

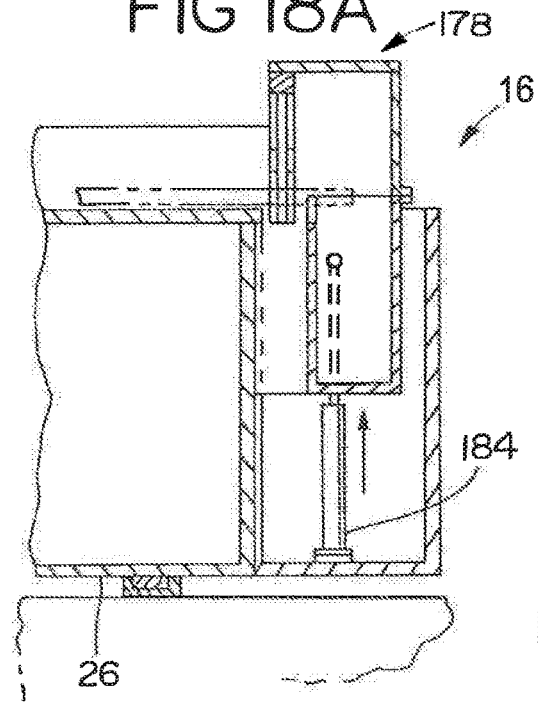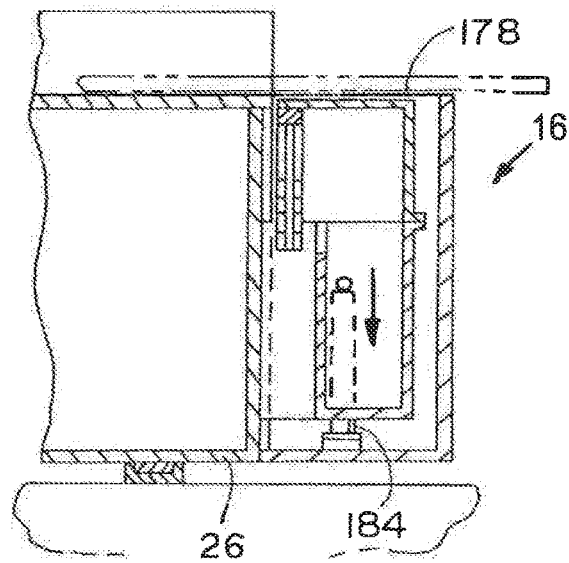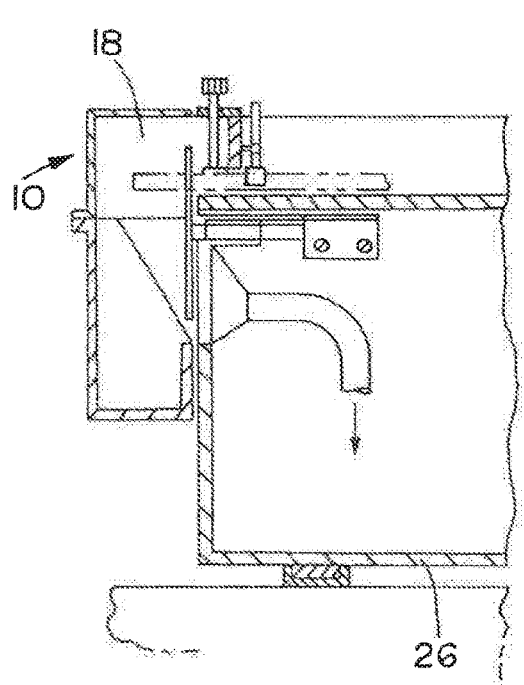

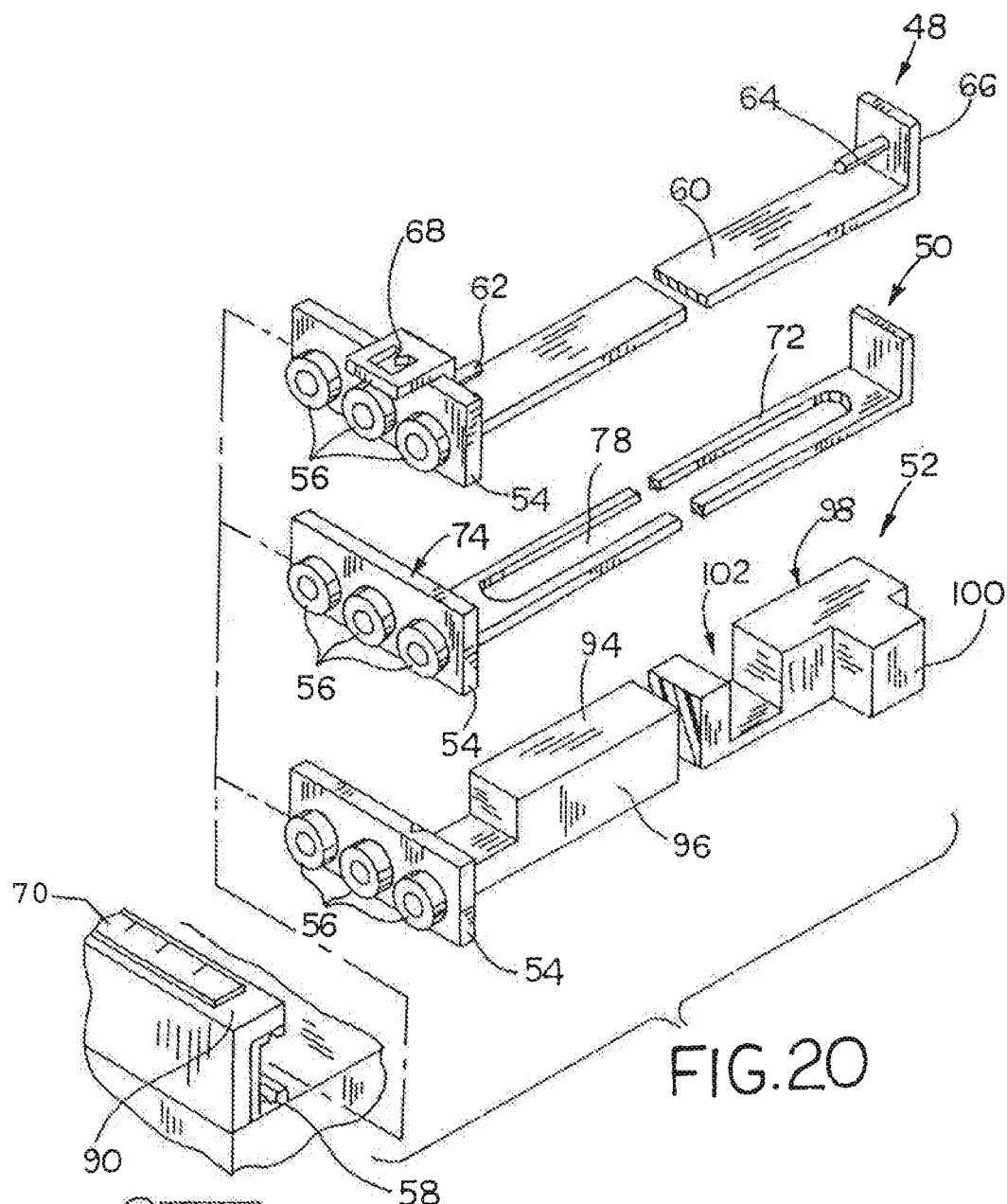
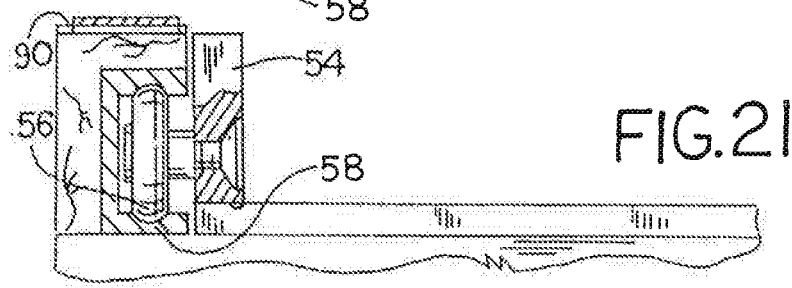

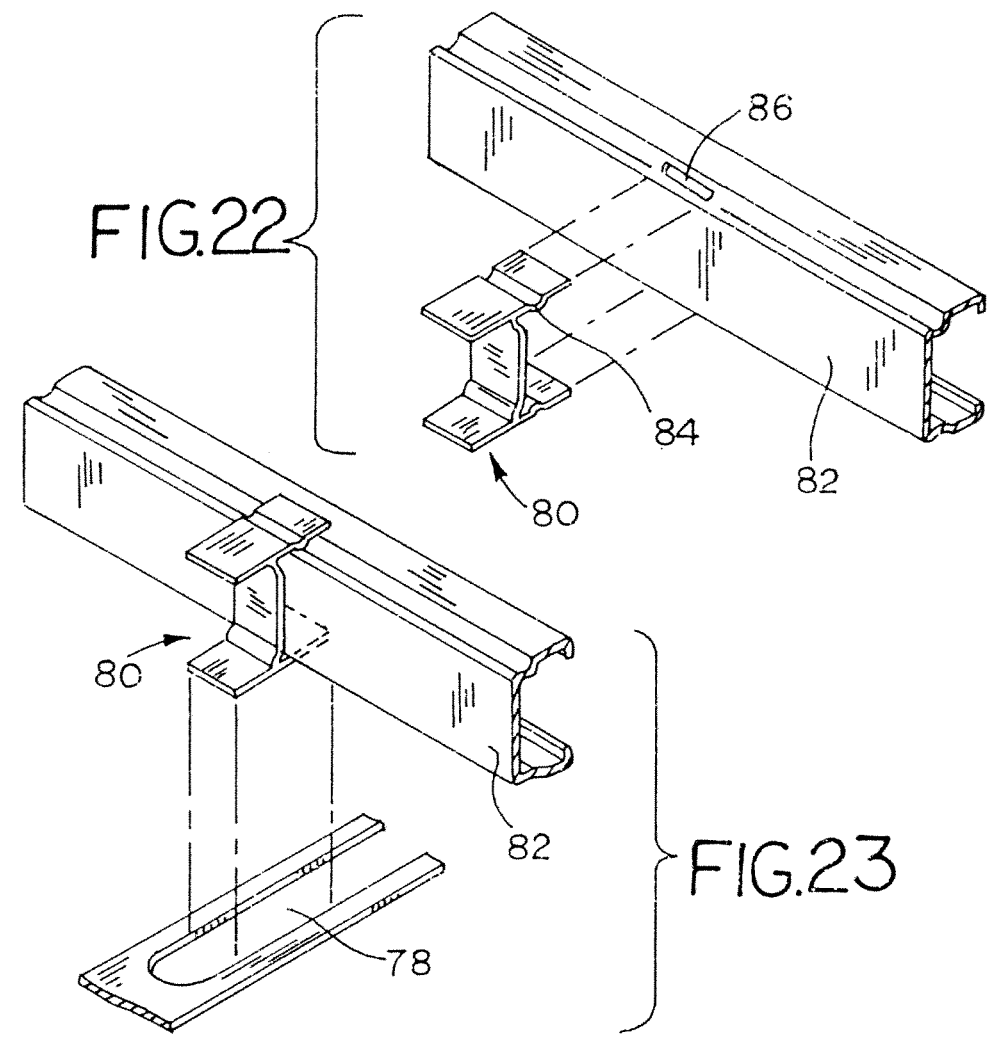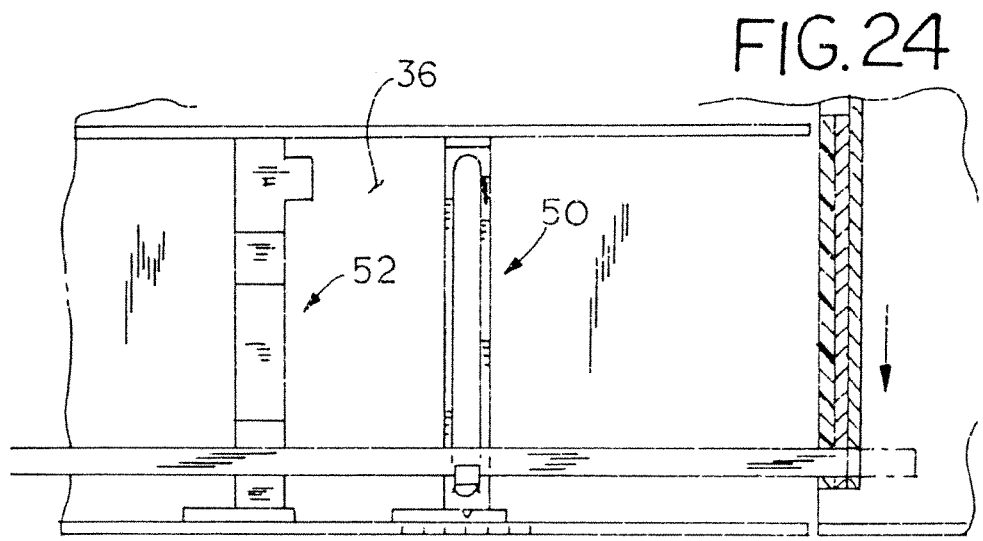

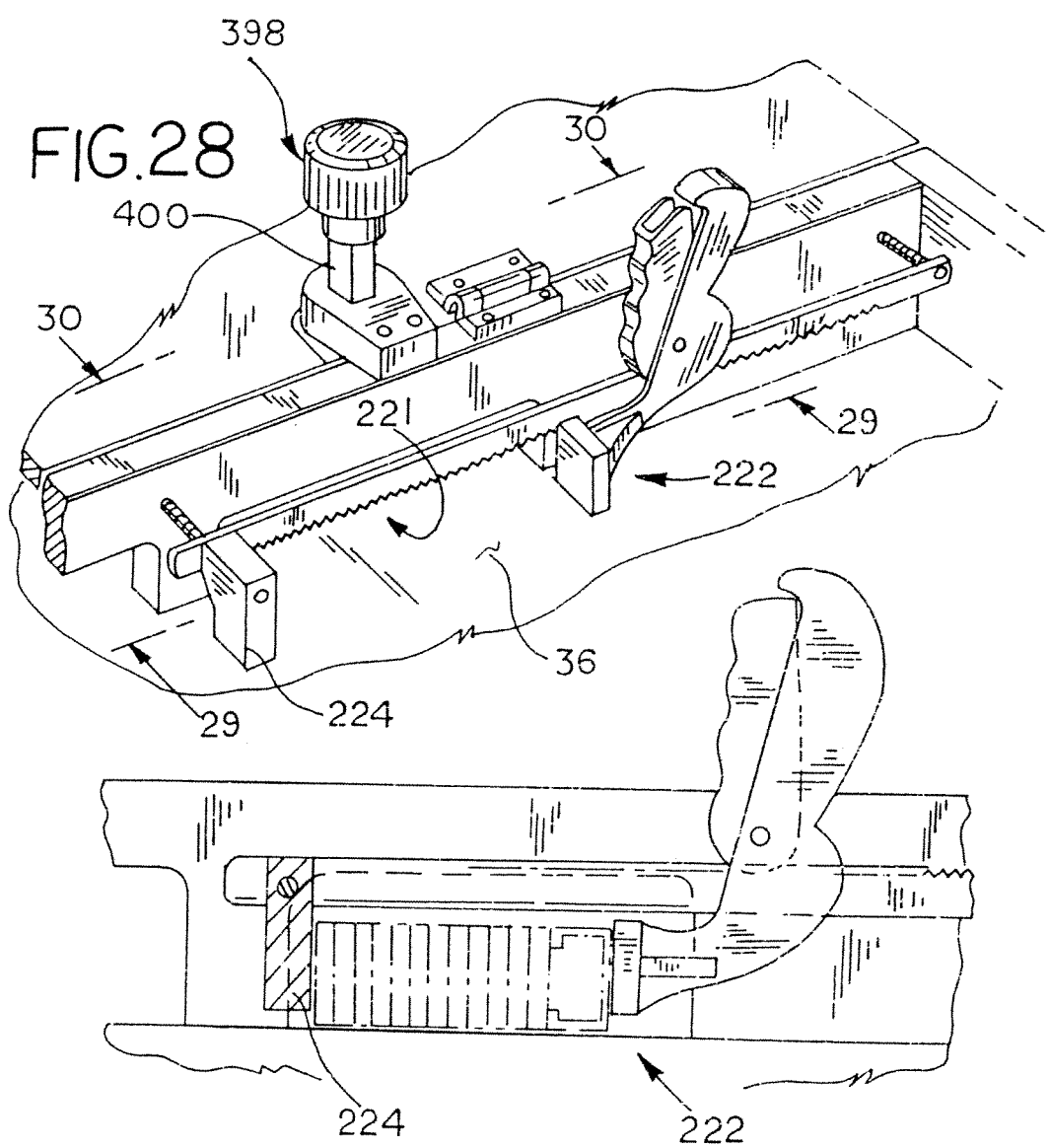

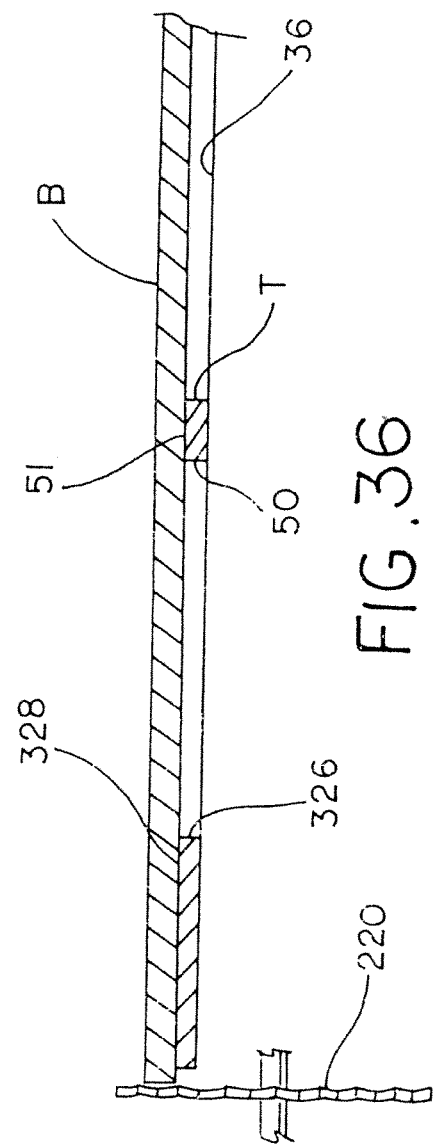

AUTOMATICALLY CONFIGURABLE BLIND CUTTING CENTER

CROSS-REFERENCE TO RELATED APPLICATION

This application is a continuation of application Ser. No. 10/378,320 filed Mar. 30, 2003, now U.S. Pat. No. 7,810,418, the entirety of which is incorporated herein by reference.

FIELD OF THE INVENTION

The present invention relates generally to the field of window covering sizing machines and more particularly to a blind and shade cutting center.

BACKGROUND OF THE INVENTION

Mass retail merchandisers sell a large number of window coverings directly to consumers. Standard sized window coverings are sized to a consumer's specifications while the consumer waits. The apparatus employed to size the various window coverings should be both easy to use by an employee of a retail outlet and should not require an extensive training period.

Additionally, the floor space that the cutting apparatus requires should fit within the existing structure and layout of the retail outlet. Further, the cutting apparatus ideally should size a number of different types of window coverings, such as metal or vinyl mini-blinds, vertical blinds, pleated shades, and cellular shades.

Various attempts have been made to integrate various window covering cutting mechanisms into a single multi-station system. One example of a multi-station system is disclosed in U.S. Pat. No. 5,456,149 to Elsenheimer et al. entitled "Sizing System for Window Coverings" issued Oct. 10, 1995. The '149 patent discloses a station having a flip-top surface including a pleated shade sizing station on one side and a mini-blind sizing station on the other. This system minimizes the space required by the merchandiser to cut various window covering products. This allows the retail outlet to include other stock and products in space otherwise occupied by various window covering sizing equipment.

Recently more retail merchandisers utilize 8-foot bay spacing to display and sell various products. Accordingly, a shade and blind cutting center that can be located within the 8-foot bay environment is needed.

The sale of vertical blind products has also increased through mass merchandiser retail outlets, requiring the ability to size not only the width of the vertical blind head rail but also the length of the vertical blind slats. However, if a cutting apparatus is to be located within an 8-foot bay environment, any vertical blind slat extending greater than 8 feet would not be able to be sized with an apparatus located within the 8-foot bay. Accordingly, there is a need for a vertical blind cutting apparatus that would fit within the 8-foot bay environment as well as be able to size vertical blind slat product having a length greater than 8 feet.

BRIEF DESCRIPTION OF THE DRAWINGS

The invention will become more fully understood from the following detailed description, taken in conjunction with the accompanying drawings.

FIG. 2a is a front view of the cutting apparatus of FIG. 1 with the front panels and the cutting motor removed.

FIG. 3 is a cross-sectional view of the apparatus taken generally along lines 3-3 of FIG. 1, detailing the vacuum motor and detachable bag.

FIG. 3a is a front detail view of the detachable vacuum bag, taken along line 3a-3a of FIG. 2a.

FIG. 4 is a top plan view of the apparatus of FIG. 2

FIG. 5 is a top partial view of the area taken generally along lines 5-5 of FIG. 4.

FIG. 6 is a cross-sectional view of the locator pin taken generally along lines 6-6 of FIG. 5.

FIG. 7 is across-sectional view of the die assembly of the first cutting station taken generally along lines 7-7 of FIG. 4.

FIG. 8 is a cross-sectional view of the die and blade mechanism of the first cutting apparatus taken generally along lines 8-8 of FIG. 4.

FIG. 9 is the die and blade portion of the first cutting apparatus of FIG. 8 in the fully extended cutting position.

FIG. 10 is a cross-sectional view of the blade and die apparatus of FIG. 8 taken generally along lines 10-10 of FIG. 8.

FIG. 11 is a cross-sectional view of the cutting mechanism taken generally along lines 11-11 of FIG. 8.

FIG. 12 is a cross-sectional view of the second cutting station taken generally along lines 12-12 of FIG. 4.

FIG. 13 is a view of the head rail cutting mechanism with the die in the raised position.

FIG. 14 is a view of the head rail cutting mechanism die cutter in the raised position with the punch mechanism fully extended.

FIG. 17 is a cross-sectional view of the apparatus taken generally along lines 17-17 of FIG. 4.

FIG. 18A is a partial cross-sectional view of the first cutting station in the upper position.

FIG. 18B is a partial cross-sectional view of the first cutting station in the lower position.

FIG. 19 is a cross-sectional view of an alternative embodiment of the first cutting station.

FIG. 20 is an exploded perspective view of three locators, rail and scale.

FIG. 21 is across-sectional view of the apparatus of FIG. 20.

FIG. 22 is an exploded perspective view of the connector clip and head rail aperture.

FIG. 23 is an exploded perspective view of the connector clip of FIG. 22 attached to the head rail aperture, and a portion of the locator.

FIG. 24 is a top partial view of the head rail and connector clip positioned by the locator.

FIG. 28 is a perspective view of the vertical slat clamp and wooden blind clamp.

FIG. 29 is a partial side view of the wooden blind clamp.

FIG. 36 is a cross-sectional view of the work surface taken from a front view of the second cutting station end of the work surface as viewed in FIG. 4.

DETAILED DESCRIPTION

Figure 1:
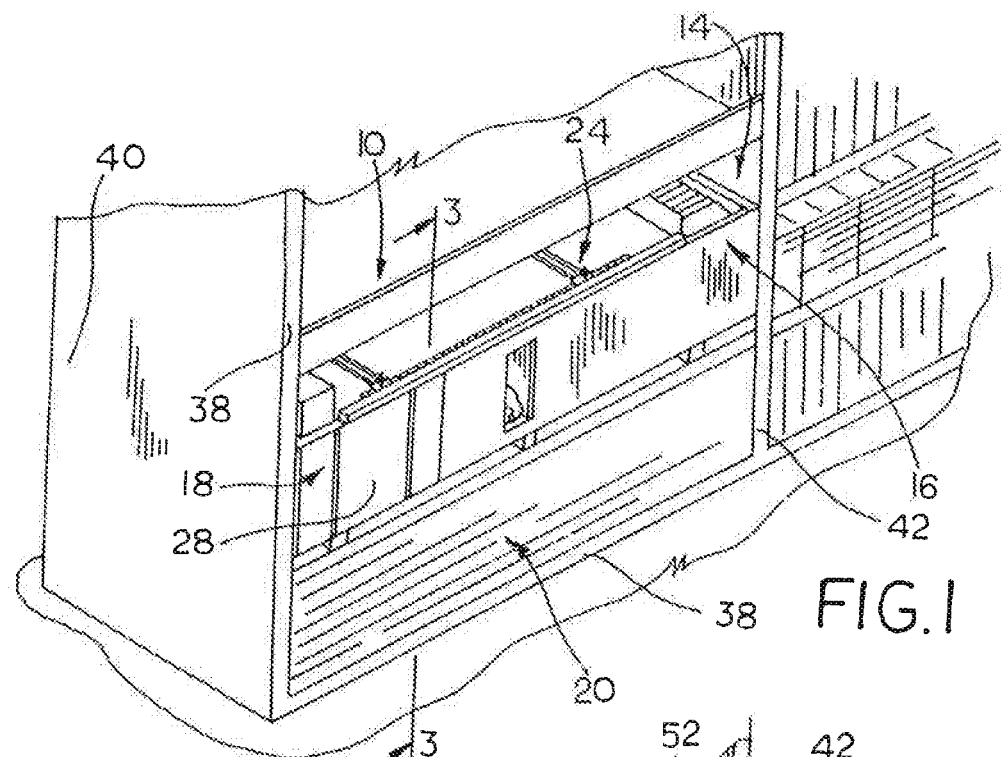
FIG. 1 is a perspective view of the apparatus located in a bay in a stored position.
Figure 2:
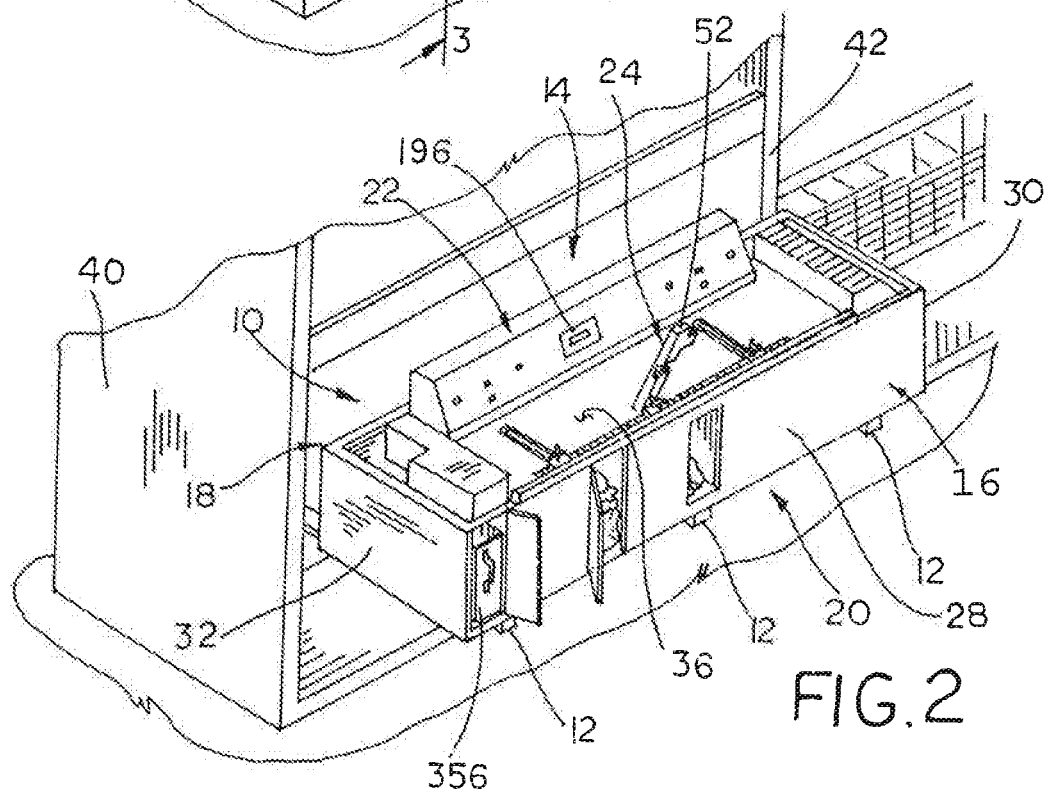
FIG. 2 is a perspective view of the cutting apparatus of FIG. 1 in an operating position.

An apparatus for sizing both blinds and shades for window coverings is generally illustrated in FIGS. 1 and 2. The blind and shade cutting center 10 is slidably movable on rails 12 in and out of a bay 14. The cutting center 10 includes a first cutting station 16 for sizing mini-blinds, pleated shades, and cellular shades. The cutting center further includes a second cutting station 18 for sizing wooden blinds and vertical blinds. The first and second cutting stations 16, 18 are supported by and located on opposing ends of a housing 20. A control panel 22 allows an operator to gain access and to control the first and second cutting stations 16, 18. Further, cutting center 10 includes a center locating and measuring system 24 to position the blinds and shades to be sized.

Referring to FIGS. 2, 2a, and 3, the housing 20 of the cutting center 10 includes a bottom 26, a front wall 28, a first and second side wall 30, 32, a rear wall 34, and a top working surface 36. The front wall 28 includes a first panel 300 and a second panel 302 fastened to the housing 20. The first panel 300 includes an opening 304.

The second panel 302 includes a first door panel 306, a second door panel 308, and a secured panel 310. The first and second door panels 306 and 308 are hingedly connected to the secured panel 310. The secured panel 310 is securely fastened to the housing 20, while the first and second door panels 306 and 308 are releasably fastened to the housing 20.

Located inside the cutting center 10 and behind the front wall 28 is a series of chambers. Closest to the second side wall 32 is a refuse chamber 312. The cutting center 10 further includes a cutting motor chamber 314, a vacuum chamber 316, a hydraulics chamber 318, a bar code scanner chamber 320, and an electronics chamber 322, wherein there is disposed a controller 323. The refuse chamber 312 and the vacuum chamber 316 are accessible by opening the first and second door panels 306 and 308, respectively. The bar code scanning chamber 320 is accessible through the opening 304 in the first panel 300.

For purposes of this application the cross-housing direction is defined as the direction that is perpendicular to the front wall 28 and rear wall 34. Similarly, the longitudinal direction will be defined as the direction that is perpendicular to the first and second side walls 30, 32. The right side of the housing 20 will be defined from the perspective of an operator as they face the bay 14. Accordingly, the first side wall 30 is on the right side of the housing, while the second side wall 32 is on the left side of the housing. The longitudinal axis of the housing will be defined as an axis extending centrally on the top working surface 36 and perpendicular to the first and second side walls 30, 32. The cross-center axis will be defined as an axis extending centrally on the top working surface 36 and parallel with the cross-housing direction. The cross-center axis is perpendicular to the longitudinal axis.

The housing 20 may be moved from a stored position (as illustrated in FIG. 1) in which the housing 20 is located within the bay 14 to an operating position (as illustrated in FIG. 2) in which the housing 20 is located substantially outside of the bay 14. The stored position permits the housing to be completely out of the aisle of a retail or mass merchandising outlet. In the operating position, the housing is accessible for an operator to size a blind or shade product as will be described below. While it is possible to size a blind or shade product while the housing is in the stored position, the length of the product to be sized may be limited by the size of the bay.

The bay 14 typically includes a front surface 38 and a first and second side support 40, 42. The supports 40, 42 may be in the form of a wall or may be in the form of a frame. When the housing 20 is in the stored position, the front wall 28 may be flush with the front surface 38 of the bay or may be located a distance within the bay from the aisle to ensure that no part of the cutting center 10 protrudes into the aisle. Further, if the cutting center 10 is completely located within the bay 14, the possibility of it being damaged by a forklift or customer carts is minimized.

The housing 20 may include a handle or handles (not depicted) to facilitate sliding the cutting center 10 in and out of the bay 14 on the rails 12. All of the equipment employed in the cutting center 10 is attached to the housing 20. The depth of the housing 20 as measured in the cross-housing direction can be less than the depth of the bay 14.

As will be described below, an exemplary cutting center 10 includes the center locating and measuring system 24 as well as an end locating and measuring system. Both systems allow the operator to size a blind or shade by referring to only the customer's specification of the final size and length of the blind. In contrast, other sizing methods require the operator to calculate the amount of material to be removed from each side of the blind and locate the blind relative to the sizing station accordingly. This may lead to errors in the final product, resulting in both scrap material as well as a delay in the time it takes to deliver a final sized product to the consumer.

The center locating system 24 positively locates the center of the blind to be sized, while the end locating system locates the shade relative to one end of the shade. Where the lift cords are visible to the consumer such as in a Venetian blind or a pleated shade, it is important that the lift cords remain symmetrical about the center of the blind. The center locating system 24 employs a half scale that permits an employee to size the blind by referring to only the customer's final width of the blind. In contrast, the end locating system may be used for cellular shades where the lift cords are hidden from view and it does not matter that the lift cords are not symmetric about the center of the shade. Similarly, the end locating system may be used for a vertical blind head rail and vanes where the products may be sized from a single end.

Figure 20A:
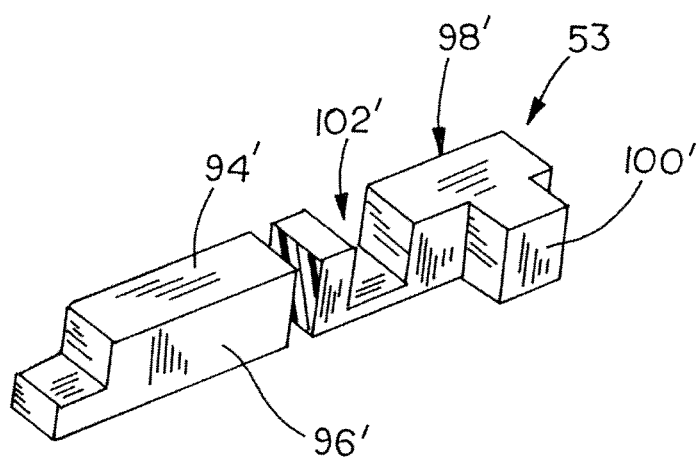
FIG. 20a is an isometric view of a first removable locator.
Figure 20B:
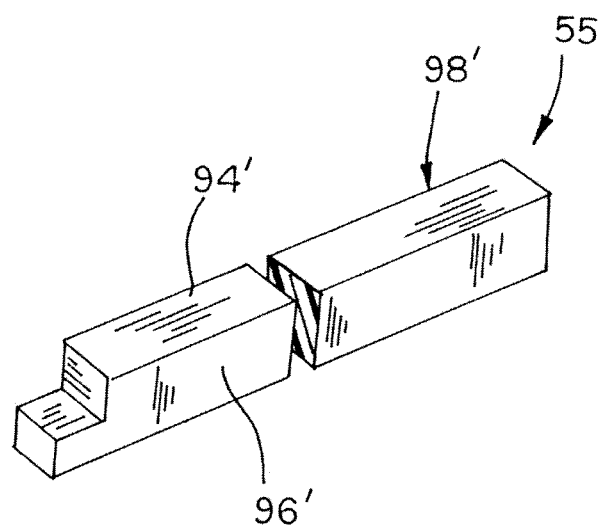
FIG. 20b is an isometric view of a second removable locator.

Referring to FIGS. 4, 20 and 21, a pin locator 48, a center clip locator 50, and an end locator 52 are illustrated. Each locator 48, 50, 52 is attached to a respective carriage 54 having a plurality of rollers 56 that are slidably received in a rail 58. The rail 58 extends proximate the front wall 28 of the housing 20 and parallel to the longitudinal axis of the housing 20. The rail 58 and carriage 54 device is available commercially and marketed under the trade mark Redi Rail™ The pin locator 48 and the center clip locator 50 illustrated in FIG. 20 are center locating devices that positively locate the center of the blind or shade to be sized. The end locator 52 is a locating device that is used to both square the blind or shade and to locate certain blind and shade products relative to one end of the blind.

The pin locator 48 and the center clip locator 50 both permit a blind to be sized from its center by engaging a center portion of the blind. The pin locator 48 includes an extension member 60 attached to the carriage. A pointer 68 is attached to the carriage 54 and indicates that position of the pin locator 48 relative to the first or second cutting stations 16, 18 by use of a scale as discussed below. The extension 60 extends in the cross-housing direction from the carriage 54 toward the rear of the top working surface 36. A first pin 62 extends from the carriage 54 parallel with the top working surface 36 of the housing 20 and towards the rear wall 34. The first pin 62 is located a predetermined distance above the top working surface 36. A second pin 64 may extend from the rear portion 66 of the extension 60 toward the front wall 28 a predetermined distance above the top working surface 36.

Pins 62 and 64 each have across section that corresponds to the cross section of an aperture in the bottom rail of the shade or blind. In the example illustrated in FIG. 6, the pin 62 has a cross-shaped cross section. However, any other shape may be employed as well, for example around cross section may be used as shown in FIG. 20. Pin locator 48 includes a pointer 68 that identifies the location of the pins 62, 64 relative to a first scale 70.

The center clip locator 50 is illustrated in FIGS. 4 and 20. The center clip locator 50 includes an extension 72 attached to the carriage 54 for slidable movement in the rail 58. A pointer 74 is attached to the center clip locator 50 that identifies the position of the locator relative to a second scale 76 (see FIG. 4). The extension 72 of the center clip locator 50 includes a slot 78 having a width configured to receive and positively locate a center clip 80 attached to the center portion of a blind head rail 82 or bottom rail (See FIG. 22).

Referring to FIGS. 22 and 23, the center clip 80 is positively secured to the head rail 82 or bottom rail by positive location of a protrusion 84 of the center clip with an aperture 86 or other locating device in the center of the head rail 82. Alternatively, the center clip 80 could include an aperture that is positioned relative to a detent or tab located on the head rail. Further, any other mechanical means of locating the center clip 80 onto the head rail may be employed. The center clip 80 may be made of a resilient material such that the center clip 80 may simply be located in the center of the blind head rail prior to sizing and maintained in place by the spring force of the center clip 80.

As illustrated in FIG. 4, the pin locator 48 is positioned on the right side of the cutting center 10 and the center clip locator 50 is positioned on the left side of the cutting center 10. However, this orientation is for illustration purposes only. It is possible that cutting center 10 includes two pin locators 48 on both the right and left sides of the cutting center or two center clip locators 50 on both the right and left sides of the cutting center 10. Any combination of locators 48, 50 may be employed depending on the type of locating system that is used to locate the actual products to be sized.

The pin locator 48 as illustrated in FIG. 4 is slidably positioned relative to a cutting plane 88 (See FIGS. 10 and 11) of the first cutting station 16 by the first scale 70. The first scale 70 is located on the right side of a raised portion 90 proximate the rail 58 (FIG. 20). Similarly, the center clip locator 50 is slidably positioned relative to the cutting plane 92 (See FIG. 15) of the second cutting station 18 by the second scale 76.

The first and second scales 70, 76 each include half scale indicia and extend proximate the front edge of the top working surface and parallel to the longitudinal axis. The first and second scales 70, 76 include half scale indicia where each unit of measurement is identified as twice its actual distance from the cutting planes of the first and second cutting stations respectively. For example, a distance of fifteen inches (15") from the cutting plane 88 of the first cutting station 16 is identified as thirty inches (30") on the half scale indicia.

The half scale indicia allows an employee or operator to size a window blind by only knowing the final desired width of the window blind. The width of the window blind is defined as the horizontal distance between the two sides of the window blind when the window blind is installed relative to the window or opening to be covered. The height of the window blind is the vertical distance that the window blind or shade covers. The term "length" as it is used in conjunction with the Venetian window blind head rail, slats or bottom rail will correspond to the width of the window blind.

Referring to FIGS. 4 and 20, the end locator 52 includes an extension 94 attached to carriage 54 for translation along rail 58. The extension 94 extends from the carriage 54 in the cross-housing direction and includes a first side 96 and a second side 98 parallel to the first side 96. The first side 96 faces the first cutting station 16 while the second side 98 faces the second cutting station 18. As will be described below, the first and second sides 96, 98 of the extension 94 extend a sufficient distance from the top support surface 36 to engage the ends of the blind or shade to be sized to help align the head rail, bottom rail and window covering material for sizing. Further, the first side 96 is also used to locate the cellular shade as will be described below. The end locator 52 further includes a set block 100 extending from the first side 96 a set distance toward the first cutting station 16. The end locator 52 further includes a cut out region or a depression 102 in the top portion of the extension 94 that permits a portion of the cellular window covering material of the cellular blind to extend through the extension 94 when the head rail and bottom rail are being sized. The end locator 52 is positioned between pin locator 48 and center clip locator 50, which in this example are on the right and left side of the cutting center, respectively and is illustrated in FIG. 4. Of course, as noted above, either the pin locator 48 or center clip locator 50 may be disposed on the right side or the left side of the cutting center 10.

It is possible that by placing the end locator 52 to the extreme left end of the work surface 36 to size a blind using the first cutting station 16, or vice versa, there still might not be enough room on the work surface 36 to size a large blind. To gain several inches of work surface 36, the end locator 52 includes a hinge near the carriage 54, such that it can be flipped up and moved out of the way (see FIG. 2). Further, first and second removable locators 53 and 55 (see FIGS. 20*a* and 20*b*) are placed near the ends of the work surface 36 and are adapted to be fitted to the pin locator 48 and the center clip locator 50 such that the removable locators 53 and 55 perform the function of the end locator 52.

The first removable locator 53 includes an extension 94' having a second side 98', and also includes a first side 96' with a set block 100' and a depression 102' the same as the first side 96 of the end locator 52 and is used to locate a blind relative to the first cutting station 16. By placing the first removable locator 53 in the left most locator, in this example the center clip locator 50, and flipping the end locator up as in FIG. 2, an additional 3-5" of work space may be gained. The first removable locator 53 can locate a cellular shade, a metal shade, or a vinyl shade, for sizing on the first cutting station 16 in the same manner as the end locator 52.

The second removable locator 55 includes an extension 94" having a first side 96" and a second side 98" the same as in the end locator 52, however, it does not include a depression 102 because no cellular shades are sized using this locator 55. Its operation is similar to the first removable locator 53, however it is placed in the locator on the right side of the cutting center 10, in this example the pin locator 48, as it is used to size blinds being cut on the second cutting station 18.

Referring to FIGS. 7-10, first cutting station 16 will be described in further detail. First cutting station 16 includes a stationary die 104 and a moveable die 106 slidably coupled to the stationary die 104. A guiding die member 108 is secured to a first face 110 of stationary die 104 to provide a plurality of beveled or flared surfaces 112 for guiding the various bottom rails, slats and head rails of the blinds and shades to be sized into openings in the stationary and movable dies 104, 106.

Referring to FIG. 8, the stationary die 104 includes three regions for cutting three different types of window covering products. The first region 114 is configured for sizing a mini-blind product having metal or aluminum slats and a metal head rail and bottom rail. This mini-blind product will be referred to as the metal mini-blind product. First region 114 of the stationary die 104 includes a first channel 116 for receiving a bottom rail of a mini-blind product, and an opening 118 for receiving a plurality of metal or aluminum slats from the metal mini-blind product. Further, first region 114 of stationary die 104 also includes a second channel 120 for receiving the head rail of the metal mini-blind product.

Additionally, stationary die 104 includes a second region 122 for sizing a mini-blind having a plurality of vinyl slats. This mini-blind configuration will be referred to as a vinyl mini-blind product. This second region includes a channel 124 for receiving the bottom rail of a vinyl mini-blind product having vinyl slats and a second opening 126 for receiving the vinyl slats, and finally a third channel 128 for receiving the head rail of the vinyl mini-blind product.

The third region 130 of stationary die 104 is for sizing a pleated or cellular shade and includes a first pair of channels 132, 134 for receiving the ends of a head rail and bottom rail from a pleated or cellular shade. Similarly, third region 130 may include a second pair of channels 136, 138 for receiving the second ends of the head rail and bottom rail from a pleated or cellular shade, when the head rail and bottom rail are not symmetric. However, in the preferred embodiment, the head rail and bottom rail are symmetric and therefore only a single pair of channels is required. Accordingly, the second pair of channels 136, 138 is shown in phantom lines. The third region 130 also includes an opening 140 for receiving the pleated or cellular material to be sized.

Referring to FIG. 9, the movable die 106 similarly has three regions that correspond with the respective three regions of the stationary die 104. The first region 142 of the movable die 106 includes a first die opening 144 to receive both the portion of the bottom rail and metal slats of the metal mini-blind to be sized. A first blade 146 is attached to the movable die 106 and separates the first die opening 144 from a second die opening 148 that receives the portion of the head rail to be sized. The first blade 146 is fastened to the movable die and includes a cutting surface 150 that is proximate the —stationary die 104. First blade 146 cuts both the metal slats and the bottom rail. The geometry of the first blade 146 permits the metal slats and bottom rail to be sized with the same blade without the blade chipping when it cuts the bottom rail member. First blade 146 has an arcuate surface that corresponds to an arcuate portion on the outer surface of the stationary die 104. However, other known cutting shapes may also be employed.

The second region 152 of the movable die 106 is located below the first region 142. The second region 152 includes a first opening 154 to receive both the portion of the bottom rail and vinyl slats of a vinyl mini-blind to be sized. A second blade 156 is attached to the movable die 106 and separates the first opening 154 from a second opening 158 that receives the portion of the vinyl mini-blind head rail to be sized. The second blade 156 is fastened to the movable die 106 and includes a sharpened edge 160 that is proximate the stationary die 104.

The third region 162 of the movable die 106 is situated in line with the first region of the movable die such that it corresponds to the third region 130 of the stationary die 104. The third region 162 includes a first opening 164 and a second opening 166. A shearing portion 168 is located proximate the first opening 164 and a shearing portion 170 is located proximate the second opening 166. However, a single opening and shearing portion may also be used.

Finally, the third region 162 of the movable die includes a third opening 172 for receiving the cellular or pleated shade material to be sized. A blade 174 is attached to the movable die 106 and has a blade edge 176 to cut the cellular and pleated material as the movable die 106 is moved from a retracted position illustrated in FIG. 8 to the fully extended position illustrated in FIG. 9.

As illustrated in FIGS. 17, 18*a*, and 18*b* the stationary and movable dies 104, 106 are attached to a frame 178 that is movable from a first position in which the first regions 114, 142 and third regions 130, 162 of the stationary and movable dies 104, 106 are proximate the top working surface 36 of housing 20, as shown in FIG. 17, to a second position in which the second regions 122, 152 are proximate the top working surface 36, as shown in FIG. 18A. Further the frame 178 may be moved to a third position in which the entire first cutting station 16 is lowered to a position below the top working surface 36 to facilitate the sizing of vertical blind slats having a length greater than the width of the housing 20, as shown in FIG. 18B.

Figure 27:
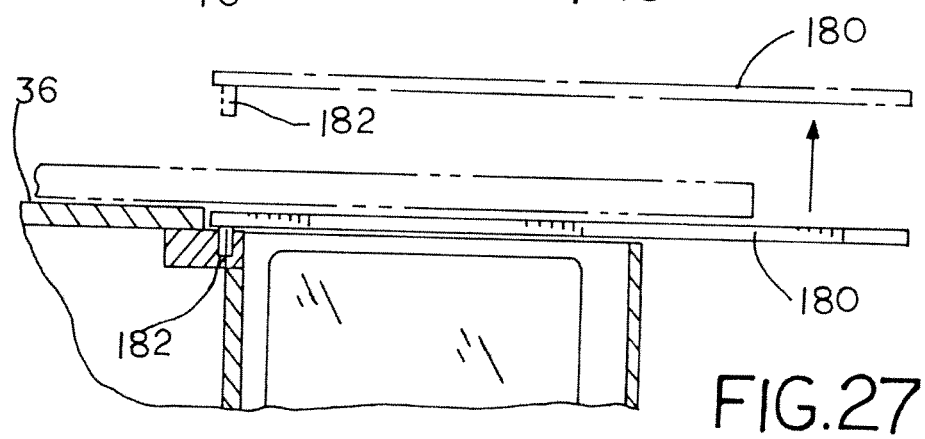
FIG. 27 is a cross-sectional view of the measuring device extension.

When the entire first cutting station 16 is lowered to a position below the top working surface 36, an extension scale 180 may be attached to the housing (See FIG. 27). A vertical peg 182 fastens the extension to the housing 20 so that the extension scale 180 remains in a plane parallel with the top working surface 36. This feature allows a simple disassembly upon raising the first cutting station 16 and also allows the extension scale 180 to slip out of its position on the housing if the first cutting station 16 is raised without first removing the extension scale 180. Further, if the housing is moved back into the bay before removing the extension scale 180, the scale will simply pivot about the peg 182 to prevent damage to the extension scale 180 or to the housing.

In the preferred embodiment, the frame is moved between the first, second and third positions with a hydraulic piston 184 that is controlled by the controller 323. The hydraulic piston 184 is shown in FIGS. 17, 18*a* and 18*b*.

In an alternative manual embodiment illustrated in FIG. 19, a spring biased release mechanism 186 is located on each side of the frame 178 to releasably secure the frame in the first, second or third positions. Each release mechanism 186 includes a spring biased button 188, each having a spring member 190 biasing a pin 192 into engagement with one of three pairs of support members 194 attached to housing 20. By manually pulling the engaged pair of buttons 188 in an outward direction, the pins 192 are released from the support member 194 and the frame 178 may be moved upward or downward to another one of the pair of support members. In this manner, the first cutting station 16 may be moved manually between the first, second and third positions.

Inside the bar code scanner chamber 320 is disposed a bar code scanner 324. The bar code scanner 324 is accessible by the user from the front of the cutting center 10 through the opening 304. The bar code scanner 324 is of standard construction. The scanner 324 is used to allow access to the cutting center 10 by a user and automatically configure the cutting center 10 based on the code of a blind scanned in. First, the user must scan the code on his or her own personal identification card. This card can be issued when the user has completed a certification course. Thus, the scanner 324 only allows employees trained in its operation to use the cutting center 10. By scanning in a user ID card, the cutting center 10 is enabled, and the user may then proceed. Next, the user scans the bar code associated with a blind product. If the blind to be cut is associated with the first cutting station 16, the second cutting station 18 is disabled, and the first cutting station is enabled. Further, if the blind to be cut is associated with the first cutting station 16, the stationary and movable dies 104, 106 are raised or lowered to accommodate the style of blind to be cut. In this example, if a metal blind is to be cut, the stationary and movable dies 104, 106 are moved to the first position.

The method for sizing a metal mini-blind product utilizing the cutting center 10 will now be described in detail. As discussed above, the cutting center 10 can cut more than one type of mini-blind or shade product. The first cutting station 16 includes two different regions for cutting two different types of mini-blind products. The mini-blind products could have different geometry necessitating different die openings, and/or different shearing configurations, and/or different blade combinations. In the example illustrated in the figures, the first cutting station 16 permits the sizing of two different mini-blind products formed of different material and having a different geometry. In the preferred embodiment, the first regions 114, 142 of the stationary and movable dies 104, 106 of the first cutting station 16 are configured to size a metal mini-blind product having a metal bottom rail, a metal head rail and aluminum slats. The second regions 122, 152 are configured to size a vinyl mini-blind product having vinyl slats.

A customer will measure the width of the window or windows to be covered and bring this dimension to a retail outlet to purchase a mini-blind product. If the mini-blind product in stock does not match the dimensions required by the customer, an employee/operator will size a stock size mini-blind product to the customer's specified dimension. This system only requires that the operator select the stock mini-blind product having a width greater than that required by the customer. The operator, as will be described herein, does not need to calculate the difference between the stock product and customer's dimensions, nor does the operator need to divide the difference between the stock mini-blind product and the customer's specifications. The operator will cut a portion of the head rail, bottom rail and window covering material from each end of the stock mini-blind product, without the need to know any value but the customer's desired end width of the mini-blind. By removing material from both ends of the mini-blind product as described below, each pair of lift cords will remain an equal distance from each respective end of the mini-blind.

Once the operator has identified and selected the stock mini-blind product closest to, yet wider than the customer's specification, the cutting center 10 is pulled from the stored position in bay 14 as illustrated in FIG. 1 to the extended position as illustrated in FIG. 2. The operator gains access to the center controls by scanning his or her unique identification card with the bar code scanner 324. This enables the cutting center and a control mechanism 196 (see FIG. 1) requests the user to scan the blind to be sized. Alternatively, the user can enter his or her identification number in the control panel 22, or any other way to enter a personal identification such as swiping a card, fingerprint scanning, etc. The control panel 22 may be connected to the controller 323 that identifies the operator seeking access to the cutting center 10. The controller 323 may also store the information entered by the operator including the time of entry. The system may further be programmed to record information relative to the stock blind being sized as a way of monitoring inventory. Additionally, the time required to size the mini-blind may be recorded. The bar code scanner 324 has the added benefit of prohibiting unauthorized personnel from accessing the cutting center 10.

After the cutting center 10 has been activated by means of the bar code scanner 324, the operator then scans the UPC or bar code of the mini blind to be sized. Because a metal mini blind product is being sized in this example, the stationary and movable dies 104, 106 are raised or lowered to the first position in which the first regions 114, 142 are proximate the top working surface 36 of the housing 20.

The operator then loads the stock mini-blind product onto the top working surface 36. As discussed above, both the pin locator and central clip locator for centrally locating the stock mini-blind to be sized may be utilized. For illustration purposes only, the pin locator 48 will be described for locating the mini-blind product relative to the first cutting station 16 and the center clip locator 50 will be described for locating the wooden mini-blind product relative to the second cutting station 18. However, the center clip locator 50 could be used to locate the mini-blind product relative to the first cutting station 16 as well.

When using the pin locator 48, the bottom rail of each stock mini-blind product includes a centrally located aperture or opening through the bottom most portion of the bottom rail. The aperture could also be a slot extending perpendicular to the longitudinal axis of the bottom rail, or an indentation or depression or connector or any other means for centrally locating the mini-blind product. The aperture is centrally located in the bottom rail, however, the aperture or locating means could also be located in the head rail. The operator locates the aperture, onto the pin 62 of the pin locator 48. The portions of the first end of the head rail, bottom rail and slats that are to be cut off are slid through the first regions 114, 142 of the stationary and movable dies 104, 106. The bottom rail is located in channel 116 of the stationary die 104 and opening 144 of the movable die 106. Similarly, the slats are located in opening 118 of the stationary die 104 and opening 144 of the movable die 106. Finally, the head rail is located in channel 120 of the stationary die 104 and opening 164 of the movable die 106.

The stock mini-blind product is positioned relative to the cutting plane 88 of the first cutting center 16 by lining up the pointer 68 of the pin locator 48 with the customer's specification on the half scale indicia on the first scale 70. The half scale indicia is dimensioned relative to the cutting plane 88 of the first cutting station 16 which is generally defined by the outer surface of the stationary die 104 that determines the location of the sized end of the head rail, bottom rail and slats after the movable die 106 is activated and shears and/or cuts the head rail, bottom rail and slats. The half scale units are one half of the actual distance from the cutting plane. For example, thirty (30) inches on the half scale is only one half of thirty (30) or actually only fifteen (15) inches from the cutting plane. Once the movable die 106 is activated the newly cut ends of head rail, bottom rail and slats will be 15 inches from the center aperture.

To activate the movable die 106 in the first cutting station 16, the operator simultaneously depresses two activation buttons (not shown). The movable die 106 is moved from the rest position to the extended position by a plunger 198 that is driven by a pneumatic or hydraulic cylinder 200. The first blade 146 shears the slats and subsequently the bottom rail, while the shear portion of opening 148 shears the head rail. If the operator releases the activation buttons during the cutting process, the movable die 106 will stop. This feature ensures that the operator's hands are safely away from the movable die 106 during the activation sequence. Once the movable die 106 is fully extended and the first end of the head rail, bottom rail and slats are sized, the movable die 106 retracts to the rest position.

After the first side of the mini-blind product is sized, the operator removes the mini-blind product from the pin 62 and rotates it such that the sized end of the mini-blind product is away from the first cutting station 16. The center aperture on the bottom rail of the mini-blind product is once again located on the pin 62. Once the mini-blind has been located, the movable die 106 is activated and the second side of the head rail, bottom rail and slats are sized. In this example, the desired width of the mini-blind product was thirty (30) inches. Since each side of the blind was sized relative to the central locating hole in the bottom rail, the cut ends of the mini-blind product are fifteen (15) inches from the center for a total mini-blind width of thirty (30) inches. In this manner the lift cords are equal distance from the center of the mini-blind product and equal distance to their respective ends of the sized mini-blind product.

The sizing of the metal mini-blind occurs while the first cutting station 16 is in the first position relative to housing 20 as described above. A vinyl mini-blind is sized in a second position of the cutting station. To move the first cutting station 16 to the second position utilizing the hydraulic piston, the operator scans the bar code associated with a vinyl mini-blind to move the first cutting station 16 to the second position. In the alternative embodiment, the manual release mechanism 186 may be used to move the frame. The buttons 188 of the release mechanism are pulled outward releasing the pins 192 from the support members 194 thereby permitting the operator to move the first cutting station 16 upward until the buttons are aligned with and engaged with a second pair of support members 194. The steps for sizing the vinyl mini-blind in the first cutting station are the same as the steps for sizing the metal mini-blind as described above. However, the vinyl mini-blind is sized in the second regions 122, 152 of the stationary and movable dies 104, 106.

The process of sizing a pleated or cellular shade will now be described. The pleated material is sized independently of the bottom rail and head rail. The shearing portions 168, 170 of the third portion 162 of movable die 106 that are used to size the bottom rail and head rail of a pleated shade are not sharp enough to cleanly cut the material. The pleated material is sized in a separate step from the sizing of the head rail and bottom rail utilizing a sharp blade 174. In a pleated blind the lift cords are visible and therefore it is desirable to have the pair of lift cords be symmetrical with respect to the center of the pleated blind. Accordingly, the pleated blind may be sized in four distinct steps. First, one end of the head rail and bottom rail are sized to the final width of the pleated shade. Second, one end of the pleated material is sized. Third, the other end of the head rail and bottom rail is sized. Fourths the other end of the pleated material is sized.

The steps for removing the cutting center 10 from the bay 14, and accessing the cutting center 10 is the same as that described above for sizing the mini-blind products. Additionally, the first cutting station 16 is moved to the first position to size the pleated shade product. This is the same position as when the metal mini-blind product is being sized.

As with the mini-blind products discussed above, the bottom rail of the pleated shade includes an aperture which is located on pin 64 of pin locator 48. In contrast to the front pin 62 utilized to locate the mini-blind products, the rear pin 64 is utilized to locate the pleated or cellular shade. By using the half scale indicia of the first scale 70, the pin locator 48 is aligned with the finished dimension of the customer's specification.

The first end of the head rail and bottom rail are slid into channels 132, 134 respectively and openings 164, 166 of the movable die 106. The pleated material however, is not slid into any opening at this time, but rather the pleated material is slid relative to the bottom rail and head rail, so that one end of the pleated material extends past the second end of the head rail and bottom rail. The first cutting station 16 is activated as discussed above with respect to the mini-blind products.

After the first ends of the pleated head rail and bottom rail are sized, the pleated material is slid into openings/channels 132, 134 of the stationary die 104 and openings 164, 166 of the movable die 106. The dimension of the guide die plate 108 proximate opening 140 does not permit the head rail and bottom rails to pass into opening 140 and is stopped a predetermined distance from the cutting plane. In the preferred embodiment, the distance from the ends is one inch. The end locator is used to size the pleated material. The end locator set block 100 received between the pleated shade bottom rail and head rail such that the set block 100 pushes the pleated material forward of the sized end of the bottom rail and head rail a predetermined distance. In the preferred embodiment, the set block extends one inch from the first side of the end locator extension to compensate for the one inch distance the bottom rail and head rails are short of the cutting plane 88. In this manner when the pleated material is sized by blade 174 the width of the pleated material is the same as the width of the head rail and bottom rail.

The process is repeated on the second ends of the pleated shade head rail, bottom rail and pleated material. Where the head rail and bottom rail are not symmetric the second ends of the head rail and bottom rail will not fit in channels 132, 134. The second ends of the head rail and bottom rail must be inserted into channels 136, 138 respectively, that are configured to accommodate the different orientation of the second ends of the pleated shade bottom rail and head rail.

Alternatively, the stock pleated shade product may be sized in three steps. First the head rail and bottom rail may be sized by cutting material off from a single end to the final width of the customer's specification. Since the head rail and bottom rail are being sized from one end only, a full scale may be utilized to locate the head rail and bottom rail relative to the cutting plane. The pleated material is then cut equally on both sides in two separate cutting operations so that the lift cords remain symmetric about the center of the head rail and bottom rail.

Figure 25:
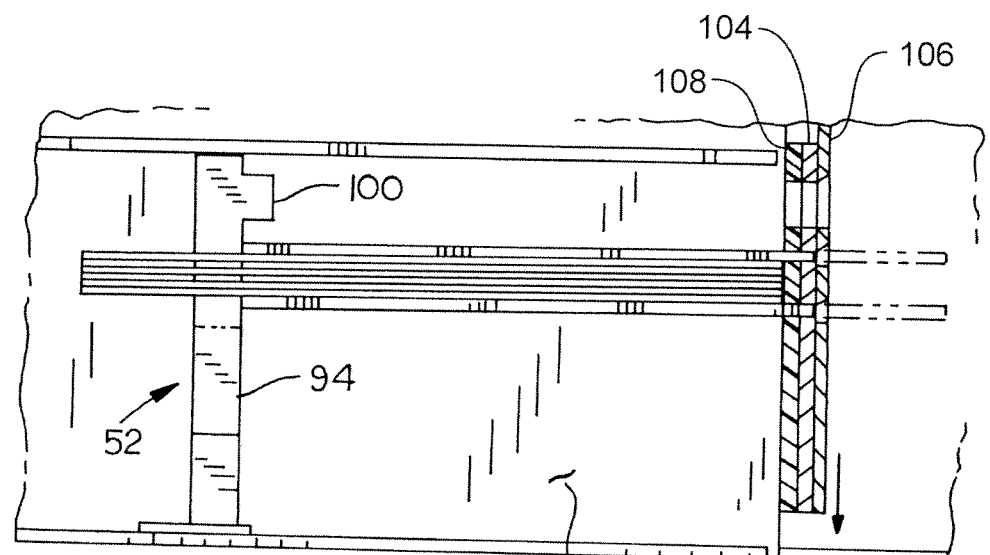
FIG. 25 is a top plan view of the cellular blind head rail and bottom rail positioned in the first cutting station of FIG. 7.
Figure 26:
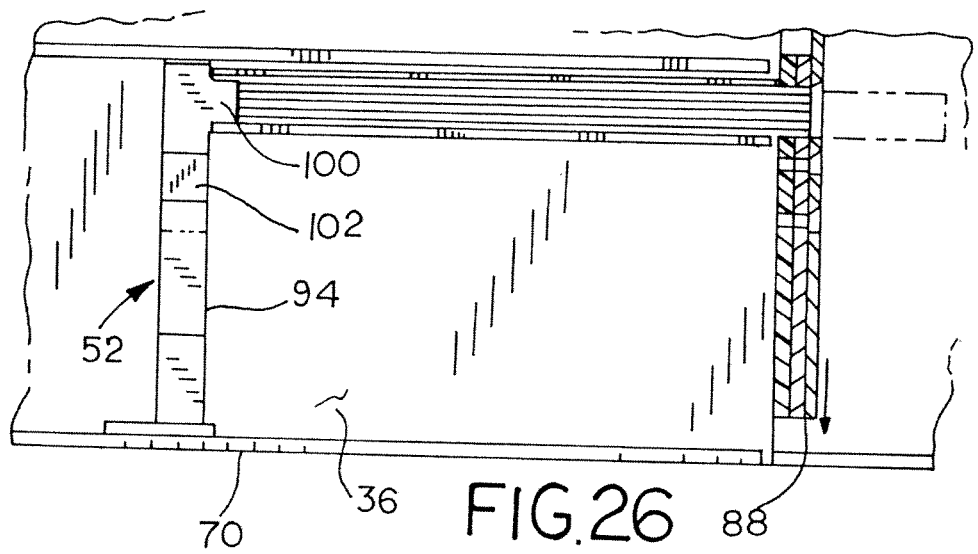
FIG. 26 is a top plan view of the cellular blind shade material positioned in the first cutting station of FIG. 7.

Referring to FIGS. 25 and 26, the sizing of the cellular product in two steps is illustrated. In the first step the entire portion to be removed from the stock cellular head rail and bottom rail is removed in a single operation of the movable die 106. Accordingly, the cellular shade may be located relative to a cellular scale 202 having full scale indicia such that the markings on the scale 202 reflects the actual distance from the cutting plane 88. The end locator 52 is utilized to locate the cellular product to be sized. The head rail and bottom rail of the cellular product are inserted into channels 132, 134 while the other ends of the head rail and bottom rail that are not to be sized are located against the first side of the end locator 52. The first side of the end locator 52 is aligned with the full scale indicia of scale 202 corresponding to the actual width of the blind as requested by the customer. When the head rail and bottom rail are being sized the cellular material is slid away from the ends of the blind to be cut off and towards the second cutting station 18. The cellular material is allowed to pass through end locator 52 extension 94 via opening 102.

Once the head rail and bottom rail have been cut to size, the cellular material is slid past the newly cut ends of the head rail and bottom rail into openings 140 and 172 of the stationary and movable dies 104. 106 respectively. The end locator set block 100 pushes the cellular material the required distance into the first cutting station to ensure that the cellular material will have the same width as the head rail and bottom rail once it is sized. The set block 100 is utilized the same way for the cellular material as for the pleated material discussed above.

Referring to FIGS. 12-16 the second cutting station 18 includes a vertical head rail shearing mechanism 204 and a wooden blind sizing mechanism 206. Vertical shearing mechanism 204 includes a stationary die 208 having a channel 210 for receiving a head rail of a vertical blind product. The stationary die 208 includes a second opening 211 for receiving the traverse rod of the vertical blind product. A movable die 212 moves relative to the stationary die 208 in a vertical up/down direction. Movable die 212 includes a shearing portion 214. Additionally, vertical shearing mechanism 204 includes a punch 216 that punches a hole in the base of the vertical blind head rail a set distance from the cut end of the head rail as described below. A vertically oriented piston 217 moves the movable die 212 upward and downward as illustrated in FIGS. 13 and 14 respectively.

Figure 15:
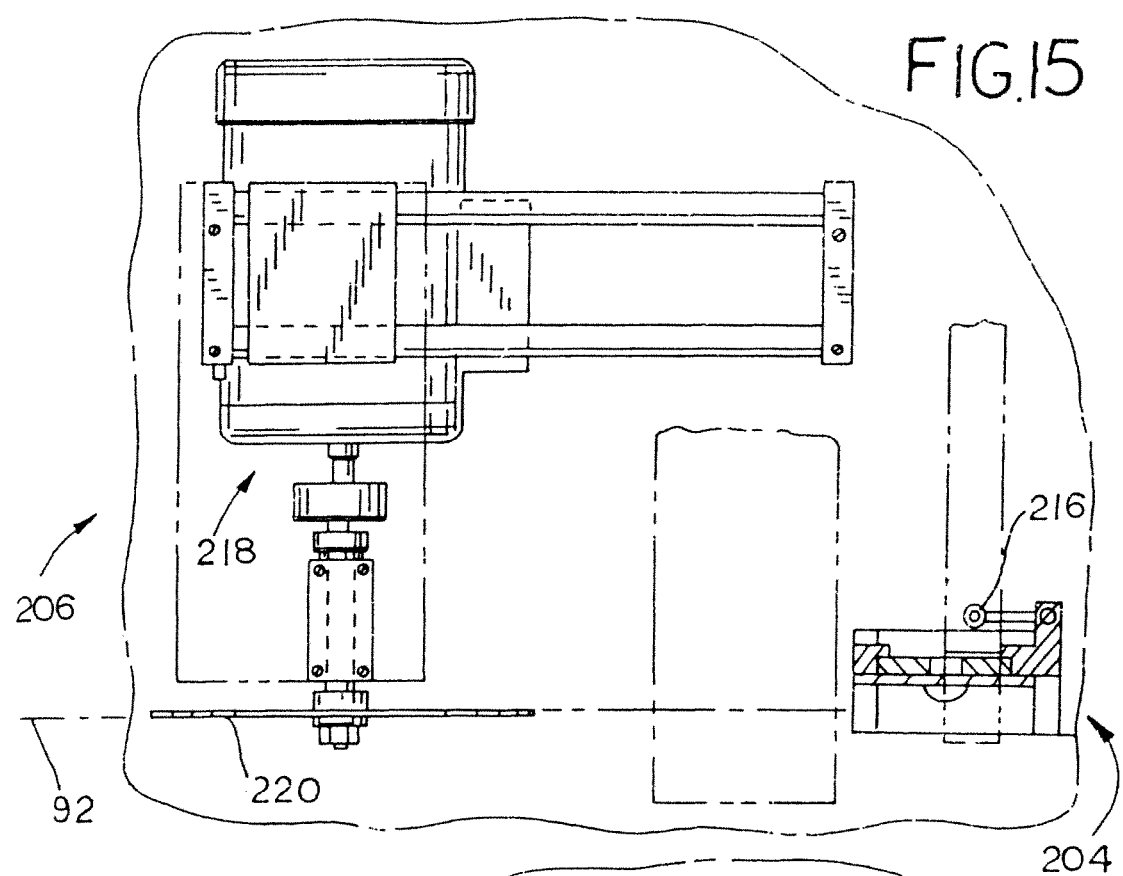
FIG. 15 is a cross-sectional view of the cutting apparatus taken generally along lines 15-15 of FIG. 12.
Figure 16:
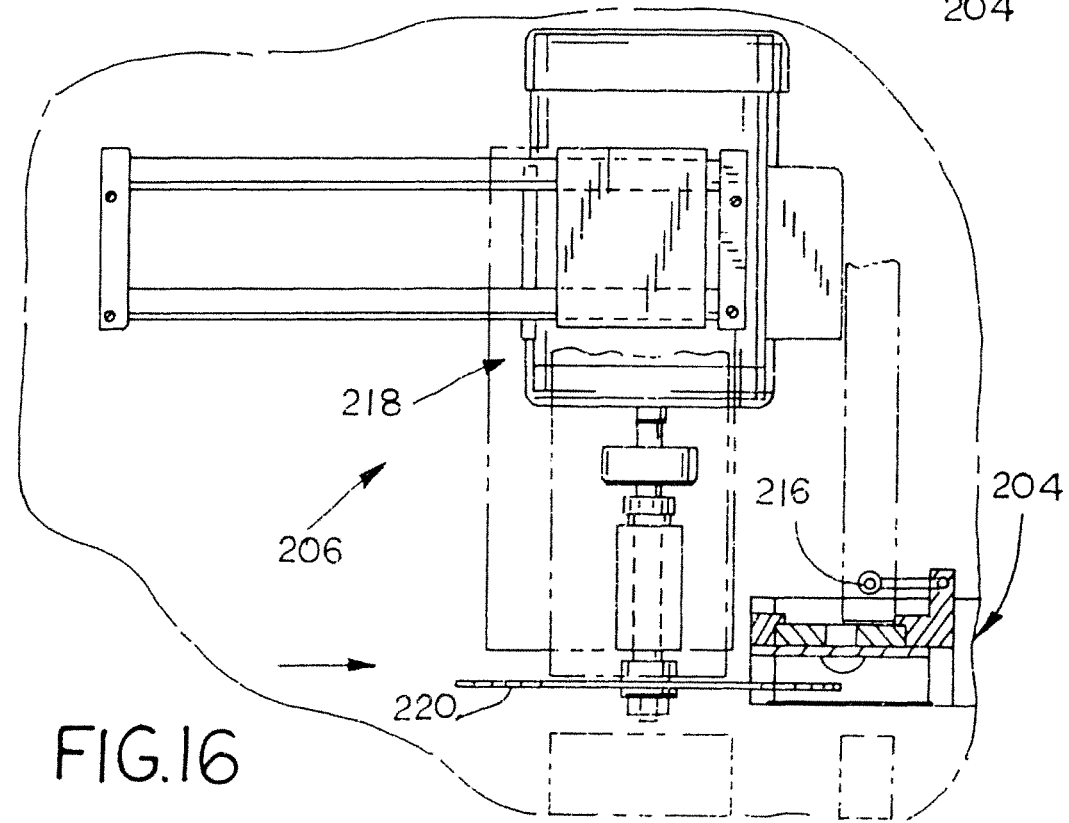
FIG. 16 is a cross-sectional view of the cutting mechanism taken generally along lines 16-16 of FIG. 12 in the extended cutting position.

Turning to FIGS. 12, 15 and 16, the wooden blind sizing mechanism 206 includes a circular saw 218 having a circular blade 220 that moves from a first position proximate the rear wall 34 to an extended position in the cross housing direction toward the front wall 28. In this example, the circular blade is an Irwin Marathon 10 inch, 80 tooth blade manufactured by American Tool, Part No. 14076.

As has been described, the center clip locator 50 slides along the top of the work surface 36 in the longitudinal direction. As seen in FIG. 36, the center clip locator 50 has a top surface 51 that supports a blind B to be sized, and a thickness t, in this example ¼". The second cutting station 18 includes a plate 326 with a top surface 328 which supports the blind B as it is being sized. To compensate for the thickness of the center clip locator 50, the plate 326 is disposed such that its top surface 328 is coplanar with the top surface 51 of the center clip locator 50. Thus, in this example, the top surface 328 of the plate 326 is ¼" higher than the working surface 36.

Figure 33:
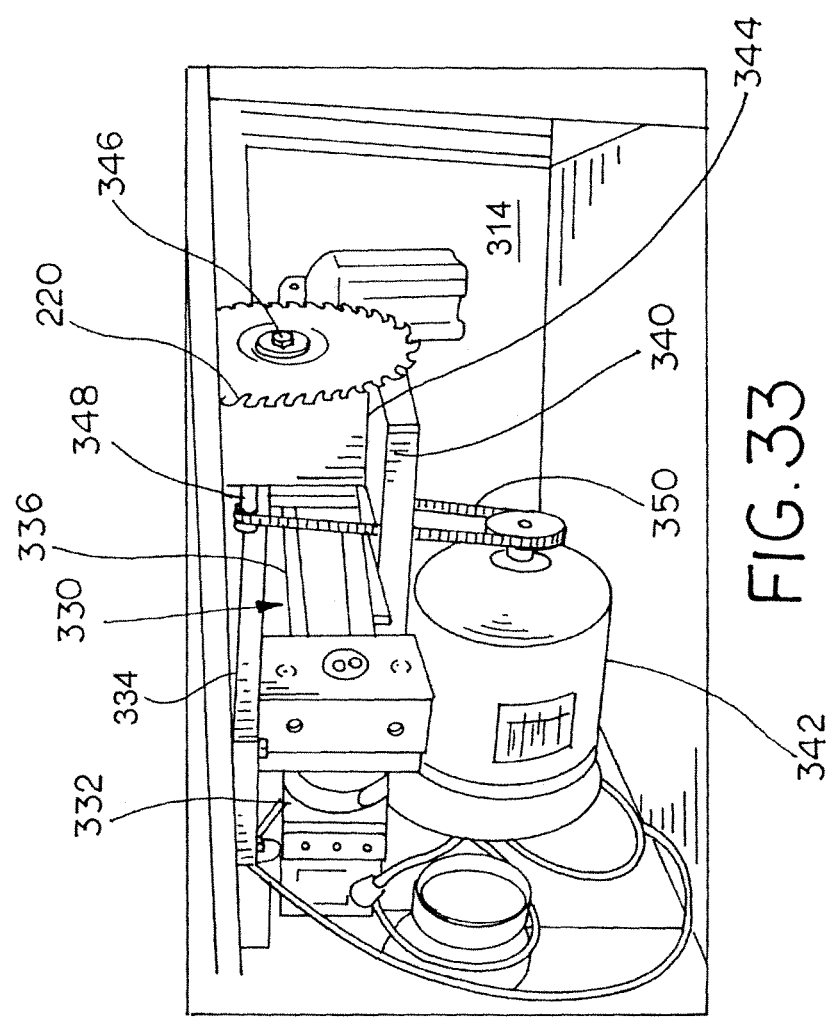
FIG. 33 is an isometric view from the rear of the inside of the machine, detailing the cutting system with the dust collection system removed.
Figure 34:
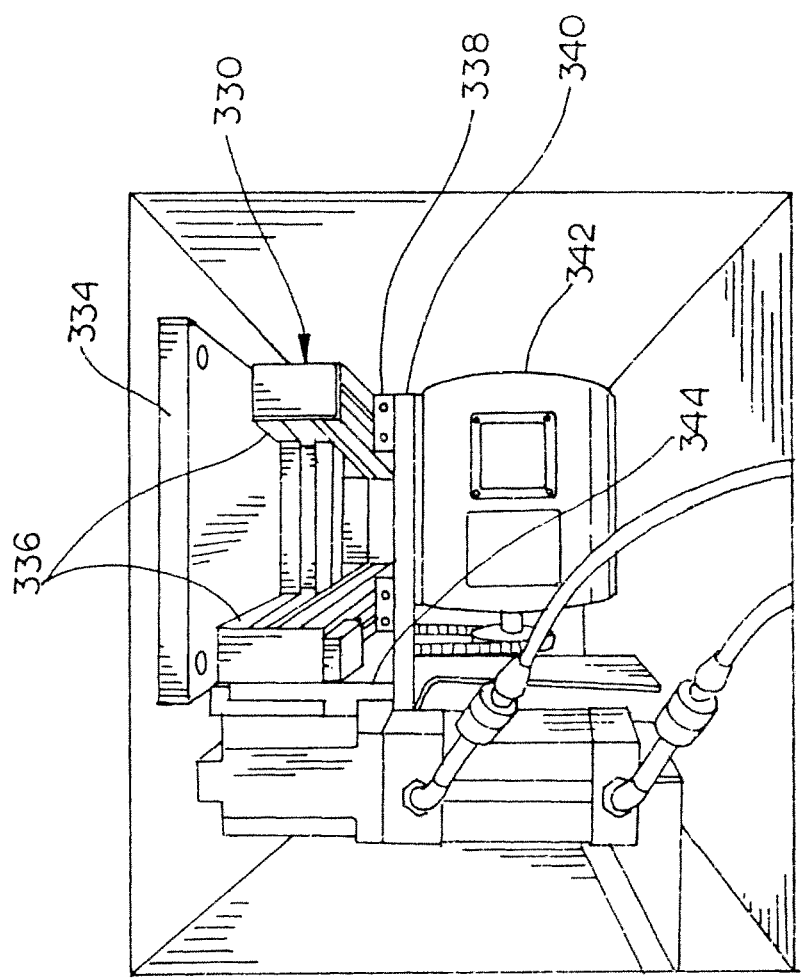
FIG. 34 is a perspective view from the front of the inside of the machine, detailing the cutting system.

Turning now to FIGS. 33 and 34, the cutting motor chamber 314 can be seen, with the vacuum system removed for clarity. The saw 218 is moved translationally along a rail system 330 by a servo drive motor system 332. A support plate 334 is securely fastened to the housing 20 within the cutting motor chamber 314. Two guide rails 336 are securely mounted to the support plate 334 such that they are perpendicular to the longitudinal axis of the machine. Slide rails 338 are translationally mounted to the guide rails 336 such that they slide relative to the guide rails 336. A motor plate 340 is securely mounted to the slide rails 338, with the saw motor 342 fastened to the motor plate 340.

Fastened to and extending up from the motor plate 340 is a saw plate 344. The saw plate 344 includes a bearing in which an axle 346 is placed. The axle 346 includes a gear 348 on one end that is connected to the saw motor 342 through a belt 350. Connected to the other end of the axle 346 is the saw blade 220. The rotation of the circular saw blade 220 is driven by the saw motor 342 connected through the belt 350. The servo motor 332 drives the wooden blind sizing mechanism 206 such that the saw blade 220 is moved along a cutting path that is perpendicular to the longitudinal axis of the cutting center 20 as can be seen in FIGS. 12, 15, and 16.

Figure 35:
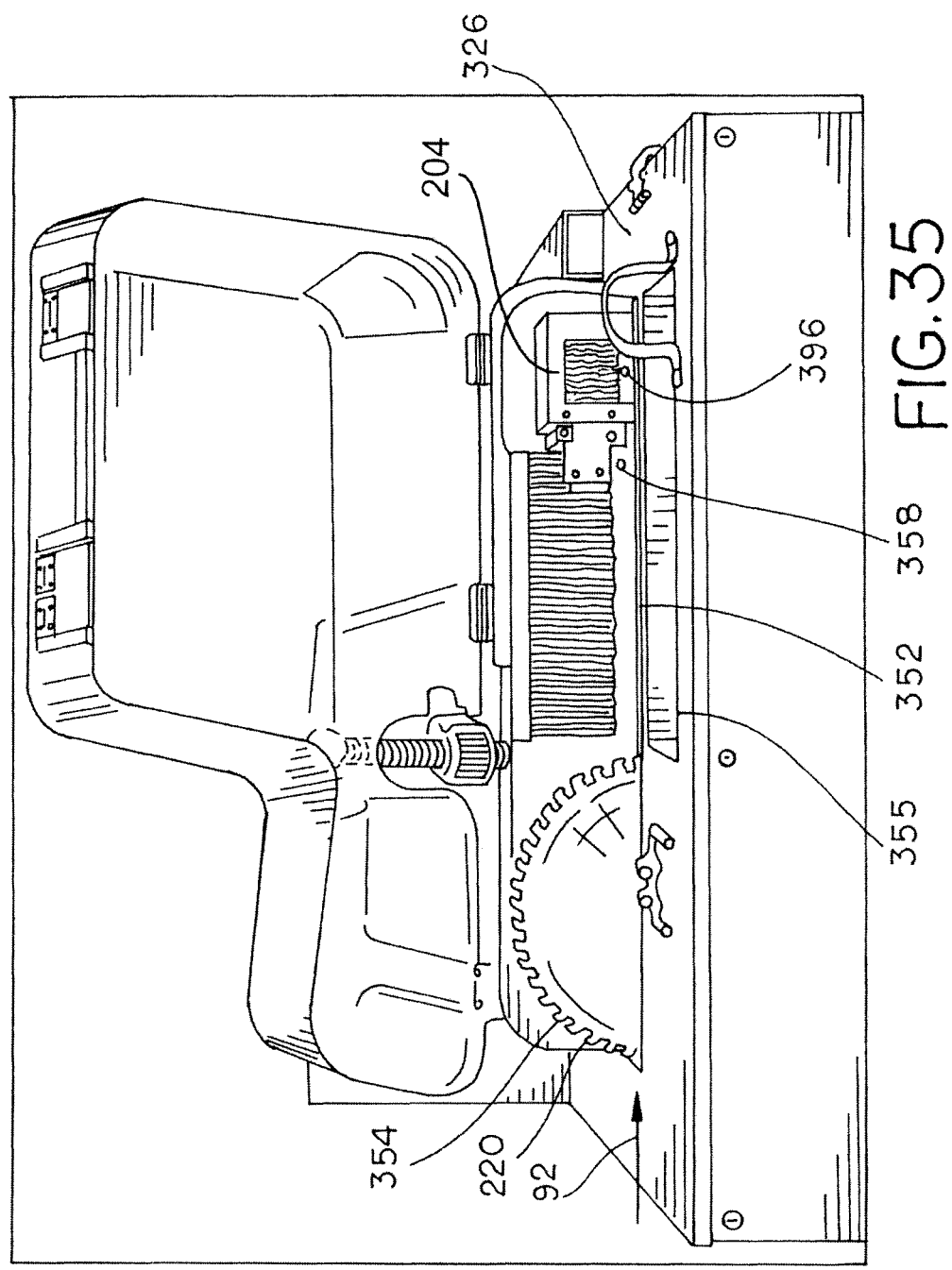
FIG. 35 is an end view of the machine from the left side, detailing the cutting system and surface.

Turning to FIG. 35, the cutting path 92 is defined by a slit 352 in the plate 326. The saw blade 220 includes an upper portion 354 above the plate 326 where the cutting action takes place, and a lower portion below the plate 326. The plate 326 is adapted to support a blind while the saw blade 220 traverses the cutting path 92 through the slit 352 in the plate 326 and sizes the blind. Large pieces that are cut off from the blind fall through an opening 355 in the plate 326 and into a refuse bin 356 in the refuse chamber 312 (see FIGS. 2 and 2A), while small particulate and dust get sucked through the slit 352 into a vacuum system as will be described later.

The servo drive motor allows the translation of the saw blade 220 along the cutting path at different speeds. In one example, the translation has three speed stages. In the first stage, or ramping stage, the saw blade 220 is accelerated, or ramped up to its translational cutting speed. In the second stage, the saw blade 220 is translated at its cutting speed in which the blind to be sized is cut. After the cut is complete, the saw blade 220 is translated back to its home position in a third stage, or return stage at a speed faster than the cutting speed. By including an increased speed during the return stage, the cycle time may be decreased significantly.

The plate 326 further includes at least one sensor 358 that is adapted to detect steel. The saw blade 220 is chosen such that it effectively cuts wood and plastic blinds, as well as the aluminum head rails. However, the saw blade 220 can be damaged by cutting through a steel head rail. Thus, if the sensor 358 determines that a steel head rail has been placed in the cutting path 92, the sensor 358 sends a signal to the controller 323 which then disables the second cutting station 18. In this manner the saw blade 220 is protected.

Figure 31:
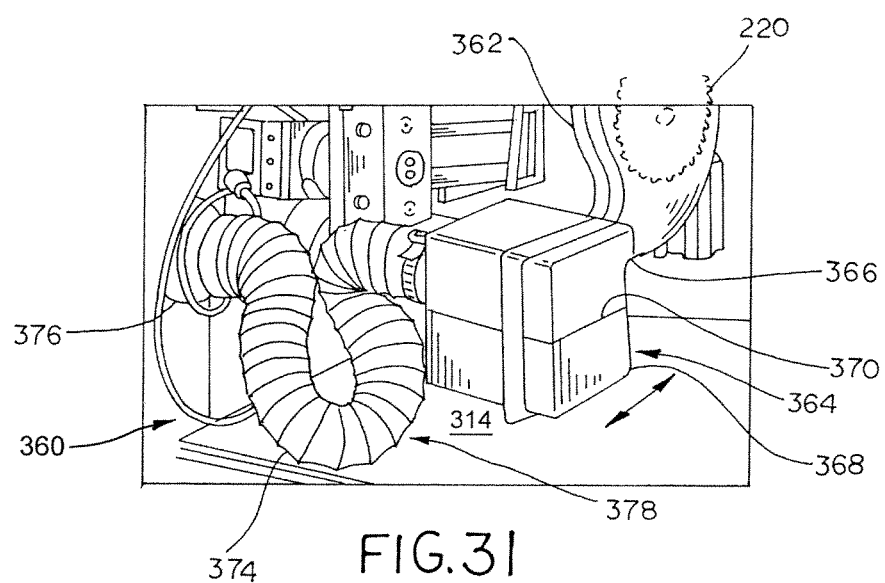
FIG. 31 is an isometric view from the rear of the inside of the machine, detailing the dust collection system.
Figure 32:
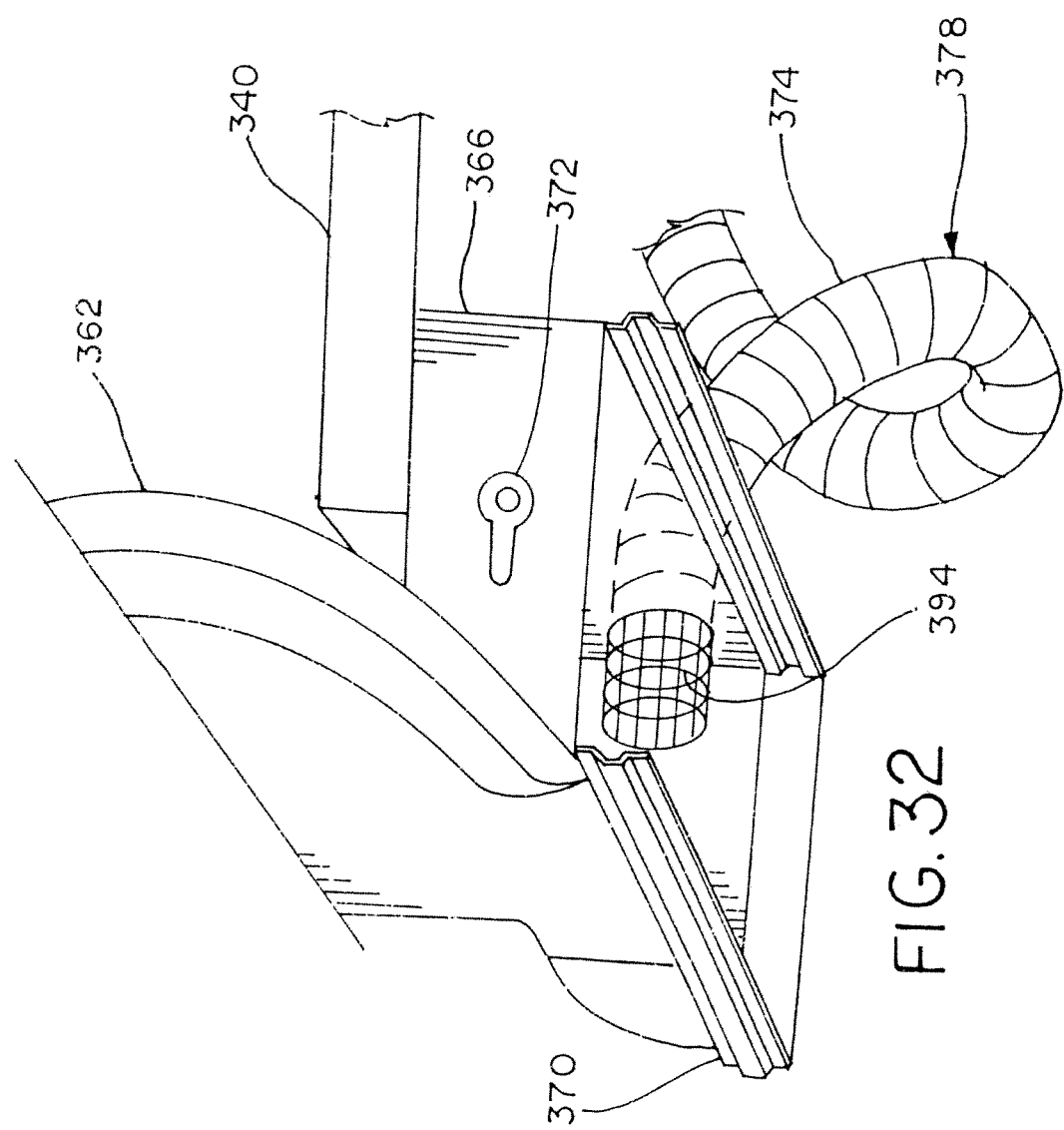
FIG. 32 is an isometric view from the front of the inside of the machine, detailing the dust collection system with the particulate bin removed.

The second cutting station 18 also has a dust and particulate collection system 360 that will now be described as seen in FIGS. 3, 3a, 3b, 31 and 32. The dust collection system 360 is disposed in the cutting motor chamber 314 and the vacuum chamber 316. Attached to the motor plate 340 is a sheath 362 that surrounds the portion of the saw blade 220 that is beneath the plate 326. Also attached to the motor plate 340 is a particulate bin 364. The particulate bin 364 and the sheath 362 are connected in an air-tight fashion. The particulate bin 364 includes a cap 366 and a body 368, wherein the body 368 is removable from the cap 366 and is attached to the cap via slide rails 370 and a locking lever 372. Connected to the cap 366 of the particulate bin 364 is a flexible hose 374, which is in turn connected a vacuum motor 376. The flexible hose is preferably as large as possible, in this example, 2" in diameter. The vacuum motor 376 is securely fastened to the housing 20, and in this example it is adjacent the rear wall 34. Since the vacuum motor 376 is stationary and the particulate bin 364 moves with the wooden blind sizing mechanism, the flexible hose 374 can be disposed in a loop 378, as shown in FIGS. 31 and 32 to accommodate the relative motion between the particulate bin 364 and the vacuum motor 376. The vacuum motor 376 should be sized to be powerful to ensure that the great majority of dust is pulled through the saw into the dust and particulate collection system. Because this vacuum motor 376 is only provided with 3" ports, adapter cones (not shown) have been added that connect the 2" hose to the 3" ports. Alternatively, 3" hoses may be used.

Figure 3A:
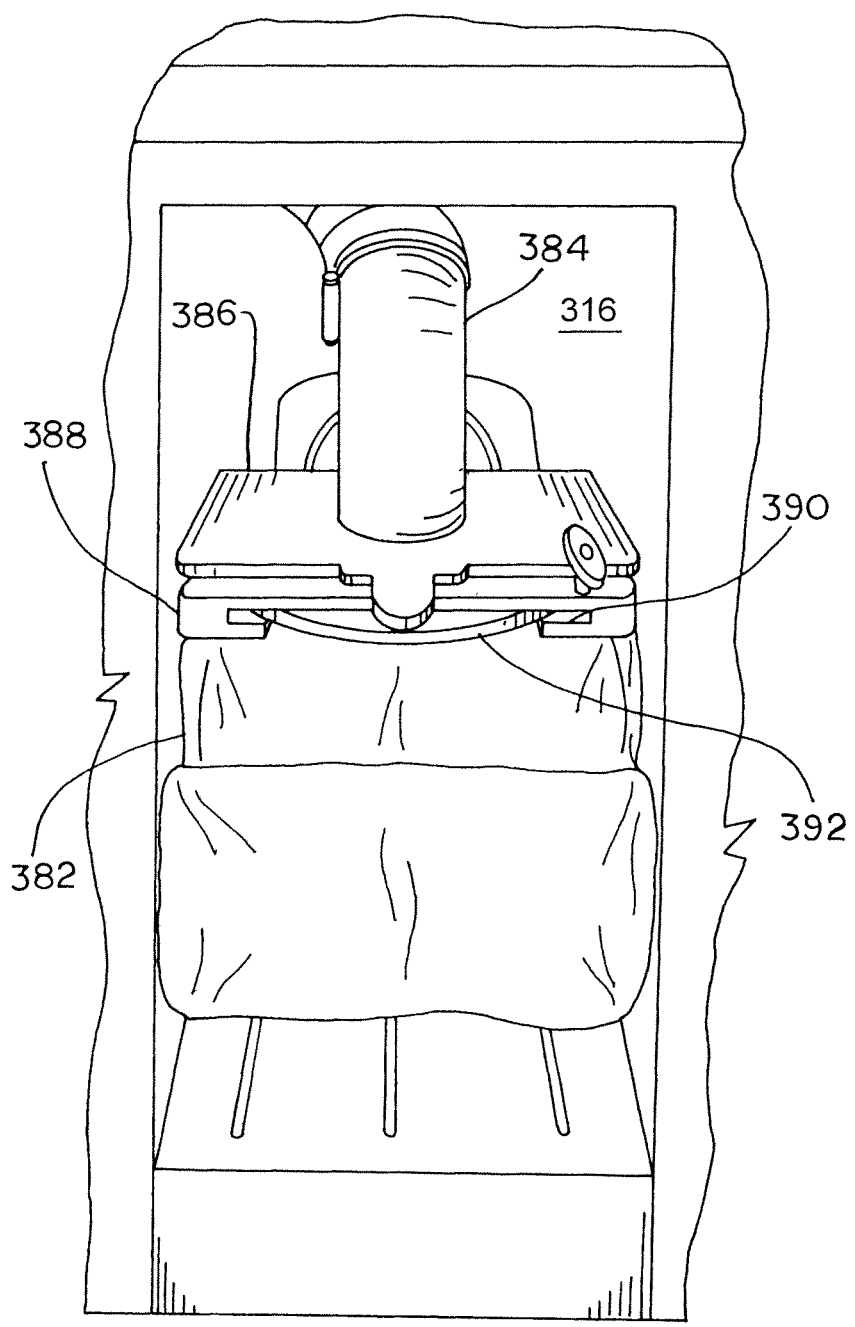
Figure 3B:
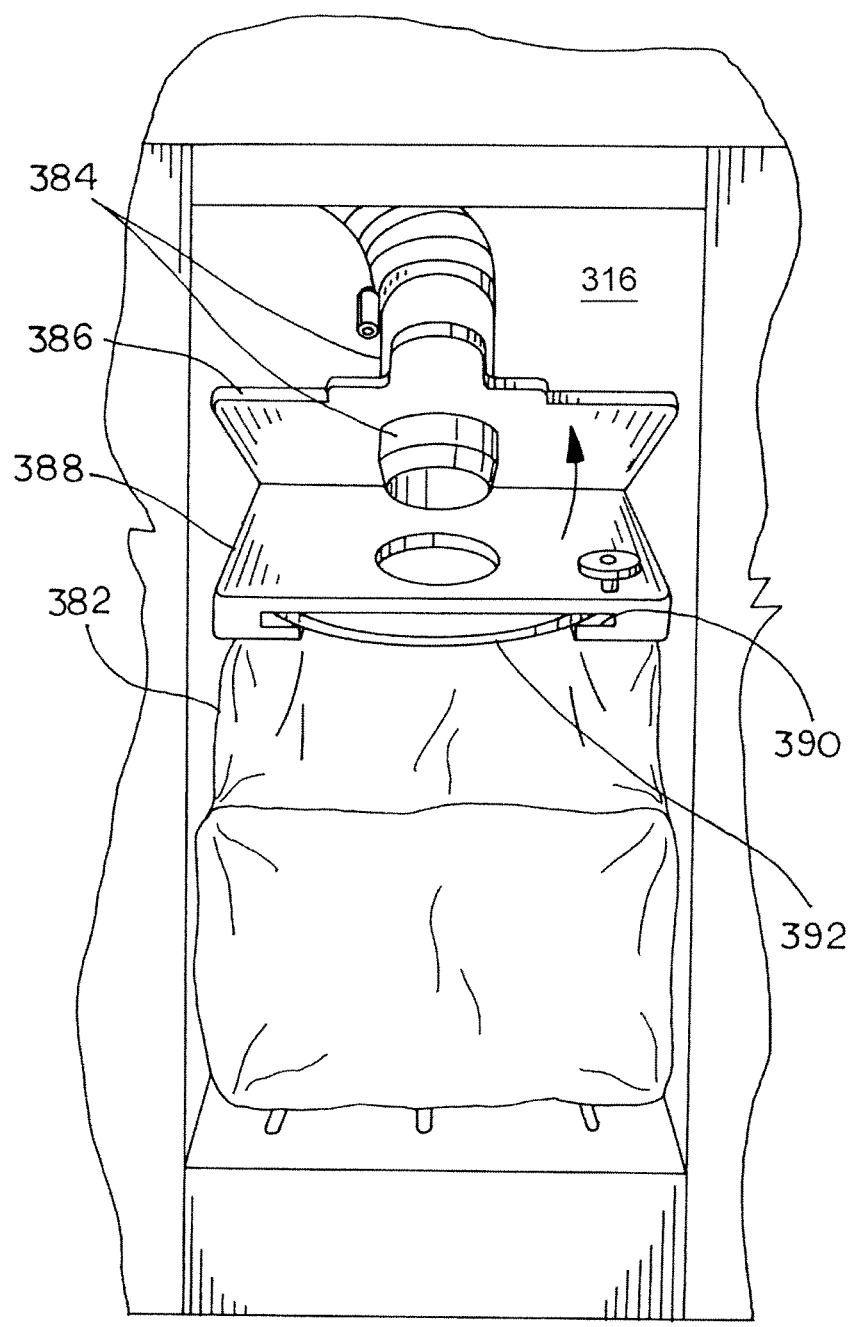
FIG. 3b is a front detail view of the detachable vacuum bag, taken along line 3a-3a of FIG. 2a, with the vacuum hose hinged away from the bag.

The vacuum motor 376 expels the debris into and through a second flexible hose 380 which leads forward toward the front wall 28 to a vacuum bag 382. As seen in FIGS. 3, 3a and 3b, the second flexible hose 380 terminates in an elbow 384 which is attached to a mounting plate 386. The elbow 384 protrudes a small distance beyond the mounting plate 386 into the vacuum bag 382. The mounting plate 386 is attached to a securing plate 388 via a spring loaded hinge (not shown). The securing plate 388 includes a groove 390 into which is fitted a lug 392 of the vacuum bag 382. In this manner, to remove the vacuum bag 382 for disposal, the user may simply lift the mounting plate 386 such that the elbow 384 is fully removed from inside the vacuum bag 382, then slide the vacuum bag 382 forward out of the housing 20, the lug 392 sliding through the groove 390.

As described earlier, the large pieces cut from the blinds fall from the end of the plate 326 into a refuse bin 356. To empty the refuse bin 356, the user opens the first door panel 306 and pulls out the refuse bin 356. Smaller particulate and dust, however, get sucked into the vacuum system 360 down through the sheath 362 by the vacuum motor 376.

A clearance is built into the slit 352 in the plate 326 such that there is adequate space between the saw blade 220 and the slit 352 that enough air flow can be directed through the slit 352 and into the vacuum system to ensure that the great majority of dust is pulled into the vacuum system. In this example, the slit 352 is approximately ½" wide.

Due to the clearance between the slit 352 and the blade 220, pieces that have been cut off up to approximately ½" can be sucked into the vacuum system 360. If these pieces were to enter the vacuum motor 376, the motor would most likely suffer damage. To ensure that no large particles become sucked into the vacuum motor 376, the particulate bin 364 is provided. Any large particles that get pulled down through the sheath 362 enter into the particulate bin 364. Because the flexible hose 374 leading to the vacuum motor 376 is disposed in the cap 366 of the particulate bin 364, inertia of the particles and gravity generally directs the particulate down to the base of the particulate bin 364 before the airstream generated by the vacuum motor 376 pulls the particulate into the flexible hose 374.

For added protection, a mesh 394 is disposed as a barrier to the entry of particulate from the particulate bin 364 to the flexible hose 374. In the present example, a wire mesh with openings of approximately 1" square is being used, however, openings of ¼" to 2" in width have proven effective. In this example, the mesh 394 is provided as a cylinder extending from inside the flexible hose 374 into the interior of the particulate bin 364. However, other configurations could be used, such as a cone, a mesh box inside the particulate bin 364 not attached to the flexible hose 374, etc. This effectively blocks the travel of particulate that has slipped through the slit 352 in the plate 326 into the vacuum system 360 from entering the vacuum motor 376. The body 368 of the particulate bin 364 is removable from the cap 366 by any structure known in the art, such as latches. Preferably, it is a quick release disconnect system.

The sizing of a wooden blind having a metal head rail, a wooden bottom rail and wooden slats will now be described. The user must first scan his or her personal ID card as has been previously described with the bar code scanner 324 to unlock the cutting center 10. The user then scans the bar code associated with the wood blind to be sized. This enables the second cutting station 18 and disables the first cutting station 16.

While a pin locator 48 could be used to locate the wooden blind for sizing, the center clip locator 50 will be described in connection with the sizing of the wooden blind. As illustrated in FIGS. 22 and 23, a head rail includes an opening 86 that receives a protrusion or tab extending from clip 80. In this manner the clip is positively located on the center of the head rail 82. The clip 80 is then positioned within a slot 78 of the center clip locator 50, which positions the clip and the head rail relative to the second half scale 76. A pointer 74 on the center clip locator identifies the center position of the wooden blind to be sized relative to the cutting plane 92 of the circular saw 218.

Once the head rail and clip are located within the slot of the center clip locator, the wooden blind bottom rail, slats and head rail are slid into a first opening 221 in the second cutting station (See FIG. 28). The wooden blind is located by moving the center clip locator 50 to align the pointer 74 of the center clip locator 50 with the customer's width specification on the second scale 76.

Once the wooden mini-blind is at the proper location to be sized, the end locator 52 is used to square the ends of the head rail, slats and bottom rail, by using the second side extension second side 98. A clamp mechanism 222 clamps the bottom rail, the wooden slats and the head rail against a stop 224 (See FIG. 29) such that the sides of the rails and slats are parallel to the top working surface 36. This removes any space distance between the slats, the bottom rail and the head rail.

Once the bottom rail, slats and head rail have been located within—the opening 221 and clamped against the stop 224, the first end of the wooden mini-blind is ready to be sized. Because the operator has already entered his or her ID and the UPC of the blind to be sized, the second cutting station 18 is activated, By simultaneously depressing two activation buttons (not shown), the following sequence is activated. The vacuum motor 376 is initiated and run for a predetermined amount of time, in this example one second. The circular saw 218 is then activated and moved toward the front wall 28 along the cutting plane 92. The saw 218 travels along the cutting plane 92 until the bottom rail, all of the slats, and the head rail are each sized. After the sizing has been completed, the saw returns to its starting position.

The circular saw 218 translational speed can vary throughout three stages of the sizing operation. In the first stage, the saw ramps up to its translational cutting speed. In the second stage, the saw maintains the cutting speed. In this stage, the saw cuts the bottom rail, slats and head rail until the bottom rail, all of the slats, and the head rail are each sized. After the sizing has been completed, the third stage of the sequence begins in which the saw returns to its starting position. In the third stage, the circular saw 218 is moved at a higher translation speed than the cutting speed such that the cycle time is much shorter than if the saw 218 was returned at the cutting speed. The circular saw 218 is moved rearward until it is in its fully withdrawn position. In the preferred embodiment the movement of the saw is automated and controlled by the controller 323.

The circular saw can have more than one translational speed through the cut. For example, it can translate slowly during the beginning of the cut, move faster, then slow down again near the end of the cut.

Large pieces of blind that have been cut fall off the plate 326 and into the refuse bin 356. Particulate and dust are sucked by the vacuum system 360 through the slit 352 and into the vacuum system 360. The particulate and dust are sucked through the sheath 362 and into the particulate bin 364. Large particulate either falls into the body 368 of the bin 364 by inertia and gravity or is blocked from entering the flexible hose 374 by wire mesh 394, then falls into the body 368 of the particulate bin 364. Dust passes through the wire mesh 394 into the vacuum motor 376 and is then pushed into and through the second flexible hose 380 and into the vacuum bag 382.

In addition to wooden slats, the circular saw 218 may also size faux wood slats made of a cellulose plastic formulation or of slats made from a plastic material, or any other type of material that can effectively be sized with a circular saw. The circular saw 218 includes a circular saw blade 220 that travels along the cutting path 92.

It is also possible to size a valance for the wooden blind at the same time the head rail, bottom rail and slats are being sized. The valance is simply located adjacent the head rail or bottom rail and sized along with the other components.

A vertical blind may also be sized in the second cutting station 18. A vertical blind head rail is sized in the vertical shearing mechanism 204 by locating the vertical blind head rail in the vertical blind head rail channel 210. The vertical blind traverse rod is located within the traverse rod opening 211. Since the vertical blind does not include lift cords, the vertical blind head rail may be sized by removing material from a single side of the stock head rail. Accordingly, a scale 225 (FIG. 4) having full scale indicia is used to determine the width of the vertical blind. Again, the width of the vertical blind is measured to correspond to the width of the window it will be covering. The cutting plane of the vertical shearing mechanism 204 is not in the same plane as the cutting plane 92 of the circular saw. The vertical shearing mechanism is set inward in the housing to permit the circular saw to fully extend along its cutting plane 92 without contacting the shearing mechanism. The scale 225 measures the actual distance to the cutting plane of the vertical shearing mechanism 204.

The vertical shear can also include a second ferromagnetic sensor 396. The second sensor 396 works in much the same fashion as the first sensor 358. Vertical head rails are large, and if a large head rail made from steel is inserted into the vertical blind head rail channel 210, the vertical shearing mechanism 204 could be damaged. Thus, when a steel head rail is placed in the channel 210, the second sensor 396 sends a signal to the controller 323, which then disables the second cutting station 18.

The vertical shearing mechanism 204 also includes a punch 216 to place an aperture in the base of the vertical head rail a set distance from the cutting plane of the vertical shearing mechanism 204. The aperture is located a predetermined distance from the cut end of the head rail to receive a portion of a snap—in end cap to be added to the vertical head rail once it has been sized. The aperture could also be used to receive a fastener such as a screw to secure an end cap to the head rail. Punch 216 is pivotally connected to a lever 228 that is pivotally connected to a portion of the vertical shearing mechanism 204. The lever 228 is pivotally connected to a head portion 230 of a rod 232 which is slidably located in a holder 234 attached to the movable die 212. The head portion 230 includes a base portion having a diameter larger than the rod 232 and larger than the opening in the holder 234.

The operation of the vertical shearing mechanism 204 for sizing the vertical blind head rail will now be described. Since the vertical blind head rail can be sized from removing material on one side of the head rail, no centering locating mechanism need be used. Rather, the vertical blind head rail can be measured by use of the full scale indicia on scale 225. The end of the vertical blind head rail to be cut is placed in channel 210 and the traverse rod is placed in opening 211. If a steel head rail is placed in the channel 210, the second sensor 396 is activated, and the second cutting station 18 is disabled. In the normal course, an aluminum head rail is placed in the channel 210, and thus, the cutting center 10 remains enabled, and the operator can proceed. The free end of the head rail that is not being sized is aligned with the full scale indicia indicating the customer's specification for the desired width of the vertical blind product. The vertical slats will be sized to a different measurement, since the important feature of the vertical slats is their vertical length when they are placed over a window. Once the vertical blind head rail and traverse rod are located in the stationary die 208 the operator activates the shearing mechanism by following the steps outlined above of scanning his or her ID code, then scanning the bar code of the vertical blind, and depressing the two activation buttons.

The movable die 212 will move in an upward direction until the "v" shaped shearing portion 214 contacts and shears the vertical head rail and the traverse rod. Once the holder contacts the base of the head portion 230, the head portion is moved upward, thereby causing the pivot of lever 228 about its pivot point and causing the punch 216 to extend downwards through the head rail. In this manner, an opening is formed in the vertical head rail a predetermined distance from the sheared end of the vertical head rail. Once the movable die has reached its fully extended upward position and the head rail and traverse rod have been sheared and the opening has been punched in the head rail, the movable die is retracted downward to the starting position.

Figure 30:
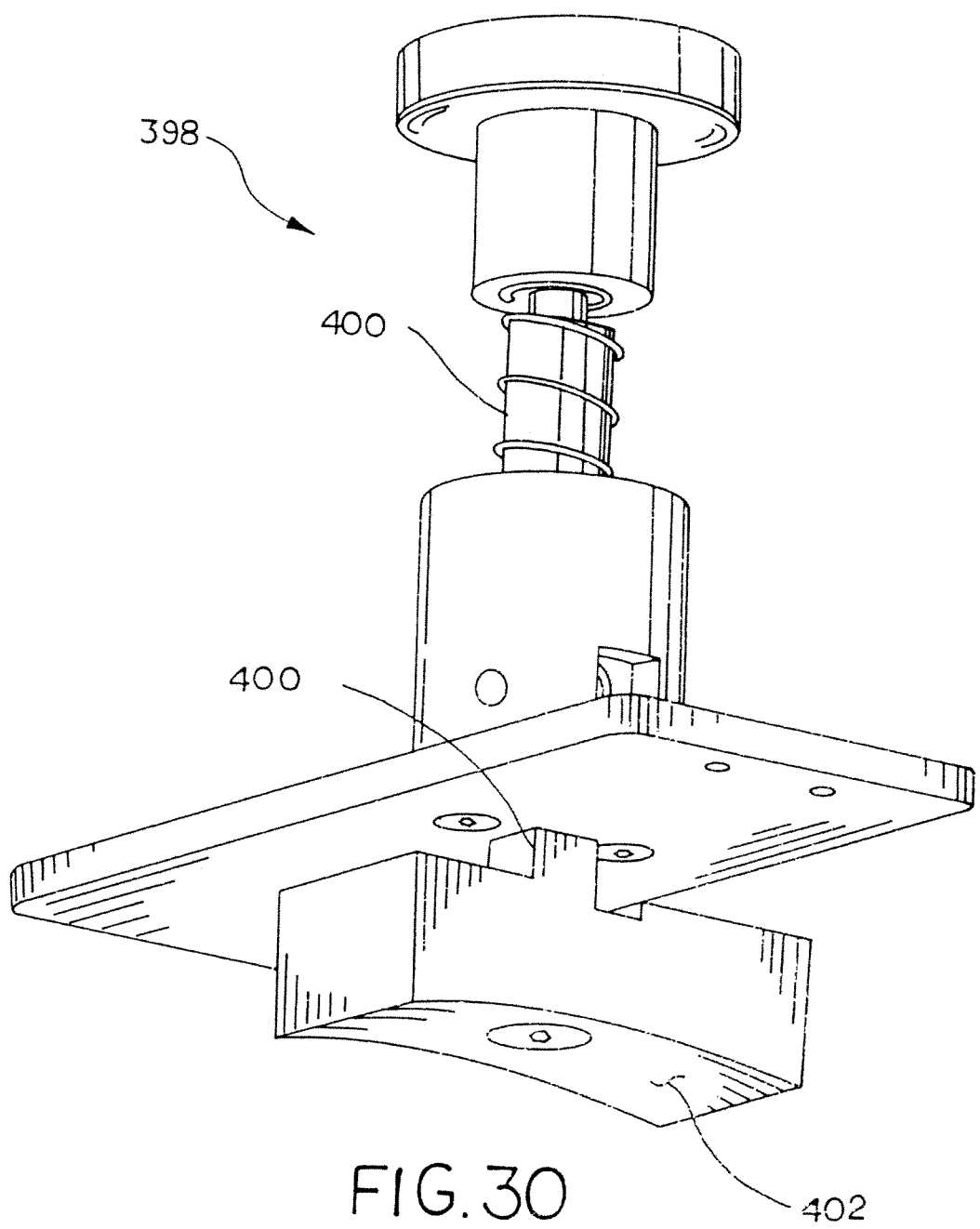
FIG. 30 is an isometric of the vertical slat clamp.

The vertical blind slats may also be sized in the second cutting station 18 to a customer's specifications. The vertical slats extend in a vertical position and therefore are likely to have a dimension different than the head rail width. The vertical slats are clamped down onto the top working surface 36 with a vertical clamp 398 (See FIGS. 28 and 30) such that the face of the vertical slats are parallel to the top working surface 36. The vertical clamp 398 includes a square shaft 400 and a concave clamping surface 402. It has been found that by cutting a blind with the saw 218, a torque is placed on the blinds during the cut. This causes the blinds to twist during the cut, and a smooth cut is difficult to produce. The shaft 400 is constructed in a shape to resist rotation during the cut. In this example the shaft 400 has a square cross section, although other cross-sectional shapes can be used effectively. Further, the clamping surface 402 is concave such that it has a similar shape as that of the blinds being cut. This further aids in the resistance to the blinds rotating during the cut.

If the vertical blind head rail is longer than the space between the first and second cutting stations 16, 18, the first cutting station 16 may be lowered to a third position as discussed above and as shown in FIG. 18b to allow the vertical head rail to rest horizontally on the top working surface 36. When the first cutting station 16 is lowered to the third position, the top of the frame 178 is substantially flush with or lower than the top working surface. The scale extension 180 is located in housing 20 and extends the full scale 225 that measures the actual distance to the cutting plane 92.

Unlike the wooden mini-blind product in which the bottom rail, slats and head rail are all positioned relative to the second cutting station together, the vertical head rail and vertical slats are positioned and sized separately.

The cutting center 10 may further include a modem, Ethernet card, or other structure to communicate information back to a central location. In the disclosed example, the controller 323 can receive information regarding the status and performance of the cutting center 10. This includes information regarding the magnetic sensors 358 and 396, the condition of any emergency stops, the amount of times a particular cutting apparatus has been used, etc. Further sensors can be placed to determine the electrical current drawn to cut down a blind, the speed of the saw blade 220, how full the vacuum bag 382 is, etc. This information can be sent via modem or other structure to the central location where engineers can review it. In this manner, the engineers can troubleshoot problems (such as a steel head rail in the saw's cutting path) and instruct the operator via telephone how to correct the problem such that a service technician is not required to be sent on site. This can result in substantial cost savings. Further, the engineer can monitor performance of the cutting center 10 to determine when maintenance needs to be performed, or to diagnose a problem before a technician needs to be dispatched.

Figure 38:
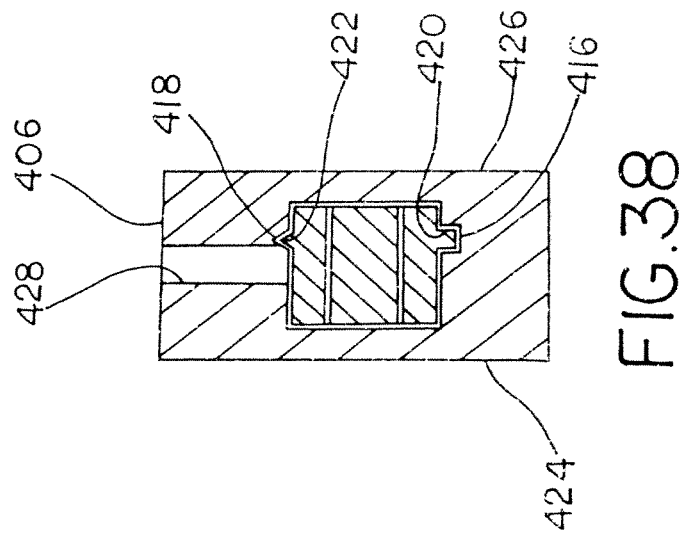
FIG. 38 is a cross-sectional view of the die block of FIG. 37, taken along line 38-38.
Figure 37:
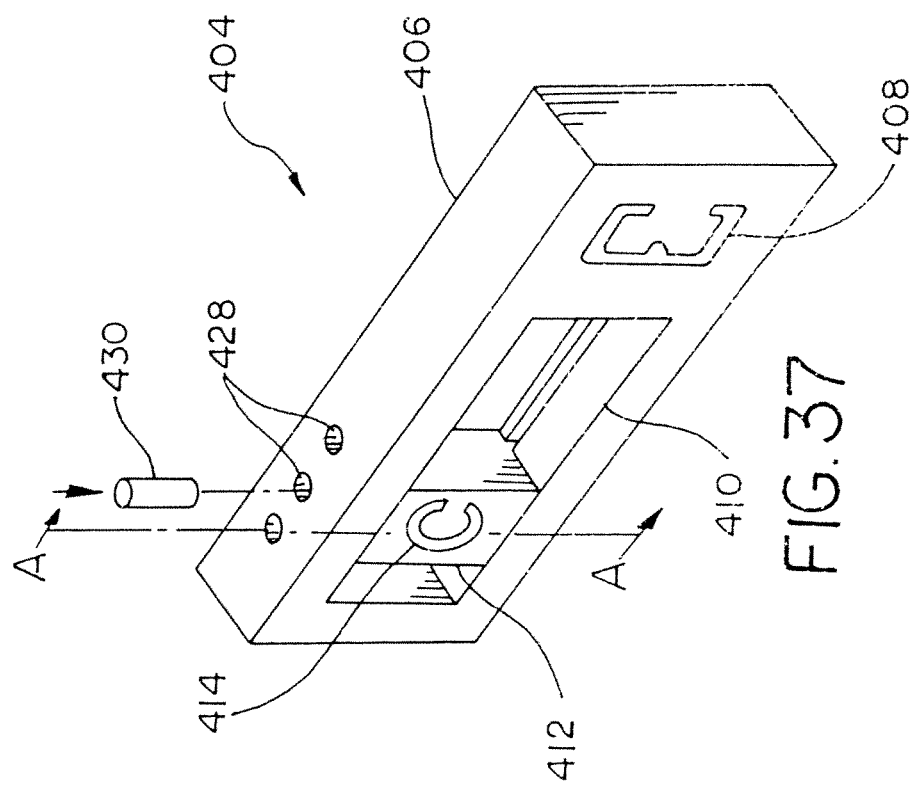
FIG. 37 is an isometric view of a die block with a movable bottom die.

A particularly useful blind cutting die 404 is disclosed in FIGS. 37 and 38. The cutting die 404 includes a body 406 with an opening 408 sized to receive a blind head rail and a slat opening 410. The die 404 further includes a bottom rail block 412 with an opening 414 sized to receive a blind bottom rail. The bottom rail block 412 is configured to be slidable within the slat opening 410. The die body 406 includes a lower channel 416 and an upper channel 418. The bottom rail block 412 includes a lower profile 420 and an upper profile 422 that are configured to slide within the lower and upper channels 416 and 418, respectively. It is useful if the upper profile 422 has a different shape than the lower profile 420 to prevent the bottom rail die block from being inserted backwards. The die body is further defined by a front side 424 and a rear side 426. It has also been found useful for the profiles 420 and 422 to be disposed off center, such that they are closer to either the front side 424 or the rear side 426. Again, this prevents the bottom rail block 412 from being inserted improperly. In this example, the profiles 420 and 422 are disposed closer to the rear side 426.

The die body 406 further includes a plurality of through holes 428. To maintain the bottom rail die block 412 in a particular position, a pin 430 is inserted into a through hole 428 and into an opening (not shown) in the bottom rail die block 412. In this manner, the bottom rail die block 412 can be adjusted to accommodate the amount of slats being sized by the cutting center 10. This is helpful in that the die block 406 itself can be used to hold the slats as they are being cut such that there is no movement of the slats during the cut.

In another embodiment, each scale is used for sizing a specific blind or shade product. Further, each scale may have a separate distinct color that corresponds with the color of the packaging for the respective blind or shade product to be sized. As a result, an operator will be able to determine which scale to use to size the stock blind or shade product by matching the color of the stock blind or shade packaging with the appropriate scale. The instructions that are located on the housing may also be in color to further reduce the chance that the particular stock blind or shade product is sized incorrectly. Additionally, the instructions that are located in an instruction manual may also be color coordinated with the scale and stock product packaging. Since the scale, packaging for the blind or shade product and instructions all share the same color for sizing of a specific product, the chance of error decreases, resulting in an easier process for the operator.

In a further embodiment, the locator pin may be eliminated. The blind or shade product may include a mark or feature that is located on its longitudinal center. This mark or feature would be aligned with the appropriate marking on the appropriate scale as discussed above. While the locator devices provide for a positive placement of the blind or shade product, it is possible to locate the center of the blind or shade product by means of a mark such as a line placed on the product in the factory before being shipped to the retail outlet. Of course the mark could also be placed by the operator in the retail outlet as well prior to sizing.

The stock blind or shade product would also have a feature such as an indentation, groove or protrusion on the center of the blind that could be used to locate the stock blind or shade product relative to the scale.

While the detailed drawings, specific examples and particular formulations given describe exemplary embodiments, they serve the purpose of illustration only. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

I claim:

1. An apparatus to size the width of a window covering in a retail store, comprising:
a support surface to support a window covering to be sized;
a first cutter configured to cut a width of a first type of window covering to a predetermined width, said first cutter being disposed adjacent to said support surface;
a controller operatively connected to said first cutter;
a first input device communicatively connected to said controller, said first input device comprising a sensor configured to automatically detect whether the window covering to be sized corresponds to the first type of window covering or a different type of window covering when the window covering to be sized is positioned proximal to said first cutter; and a second input device communicatively coupled to said controller, said second input device being configured to receive information associated with the window covering to be sized;

wherein said controller is configured to disable said first cutter when said sensor detects that the window covering to he sized corresponds to the different type of window covering to prevent said first cutter from being used to cut the window covering to be sized.

2. The apparatus of claim 1, wherein said second input device comprises a bar code scanner.

3. The apparatus of claim 2, wherein:

said bar code scanner is configured to scan a bar code of the window covering to be sized, the bar code containing said information associated with the window covering to be sized such that said information is transmitted from said bar code scanner to said controller; and said controller is configured to enable or disable said first cutter based on the bar code information received from said bar code scanner.

4. The apparatus of claim 1, wherein said controller is configured to enable or disable said first cutter based on said information received from said second input device.

5. The apparatus of claim 1, further comprising:

a second cutter configured to cut a width of the different type of window covering to a, predetermined width;

wherein said controller is configured to enable said second cutter for cutting or maintain said second cutter enabled for cutting when said sensor detects that the window covering to be sized corresponds to the different type of window covering.

6. The apparatus of claim 5, wherein said second cutter is disposed adjacent to said support surface at an opposite end of said support surface from said first cutter.

* * * * *